(12) United States Patent
Shen et al.

(10) Patent No.: US 12,376,163 B2
(45) Date of Patent: Jul. 29, 2025

(54) 5G SA NETWORK-BASED CALL METHOD, ELECTRONIC DEVICE, AND SYSTEM

(71) Applicant: Huawei Technologies Co., Ltd., Shenzhen (CN)

(72) Inventors: Yujuan Shen, Shanghai (CN); Wei Huang, Shanghai (CN); Fengguang Qiu, Shanghai (CN); Jian Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 366 days.

(21) Appl. No.: 17/800,374

(22) PCT Filed: Feb. 5, 2021

(86) PCT No.: PCT/CN2021/075538
§ 371 (c)(1),
(2) Date: Aug. 17, 2022

(87) PCT Pub. No.: WO2021/164580
PCT Pub. Date: Aug. 26, 2021

(65) Prior Publication Data
US 2023/0086087 A1    Mar. 23, 2023

(30) Foreign Application Priority Data
Feb. 18, 2020 (CN) ........................ 202010100415.1

(51) Int. Cl.
*H04W 76/12* (2018.01)
*H04W 8/24* (2009.01)
(Continued)

(52) U.S. Cl.
CPC ............ *H04W 76/12* (2018.02); *H04W 8/24* (2013.01); *H04W 76/18* (2018.02); *H04W 76/32* (2018.02); *H04W 88/06* (2013.01)

(58) Field of Classification Search
CPC ............... H04W 8/24; H04W 36/0022; H04W 36/00222; H04W 76/12; H04W 76/16; H04W 76/18; H04W 76/32; H04W 88/06
See application file for complete search history.

(56) References Cited

U.S. PATENT DOCUMENTS

2018/0132141 A1    5/2018    Huang-Fu et al.
2019/0281506 A1    9/2019    Chiang et al.
(Continued)

FOREIGN PATENT DOCUMENTS

CN    107534906 A    1/2018
CN    108702593 A    10/2018
(Continued)

OTHER PUBLICATIONS

Qualcomm Incorporated, Voice over NR Feature Planning, 3GPP TSG-RAN WG2 meeting #101, R2-1802606, Athens, Greece, Feb. 26 Mar. 2, 2018, (Resubmission of R2-1800905), 3 pages.
RFC3261 J. Rosenberg, "SIP: Session Initiation Protocol",Network Working Group Standards Track,dated Jun. 2002, total 269 pages.
3GPP TS 23.501 V0.1.1 (Jan. 2017);3rd Generation Partnership Project; Technical Specification Group Services and System Aspects-;System Architecture for the 5G System;Stage 2(Release 15),total 67 pages.
(Continued)

*Primary Examiner* — Pao Sinkantarakorn
(74) *Attorney, Agent, or Firm* — Conley Rose, P.C.

(57) ABSTRACT

A terminal first connects to a 5th generation (5G) standalone (SA) network and initiates a call to another terminal by using a Voice over New Radio (VoNR) technology. When the terminal fails to call the other terminal, the terminal disconnects from the 5G SA network, connects to a Long-Term Evolution (LTE) network, and then automatically initiates a call to the other terminal by using a Voice over LTE (VoLTE) technology.

20 Claims, 16 Drawing Sheets

(51) Int. Cl.
  *H04W 76/18*  (2018.01)
  *H04W 76/32*  (2018.01)
  *H04W 88/06*  (2009.01)

(56) References Cited

U.S. PATENT DOCUMENTS

| | | | |
|---|---|---|---|
| 2019/0373515 A1* | 12/2019 | Balasubramanian | ........................ H04L 65/1016 |
| 2019/0387571 A1 | 12/2019 | Youtz et al. | |
| 2020/0015128 A1 | 1/2020 | Stojanovski et al. | |
| 2020/0112892 A1* | 4/2020 | Shi | ...................... H04L 65/1104 |
| 2020/0383010 A1* | 12/2020 | Zhu | ................. H04W 36/00226 |
| 2021/0037430 A1 | 2/2021 | Jin et al. | |
| 2021/0051529 A1* | 2/2021 | Yuan | ........................ H04W 4/16 |
| 2021/0051530 A1* | 2/2021 | Venkataraman | ...... H04W 76/12 |
| 2022/0086721 A1* | 3/2022 | Wu | ................. H04W 36/00698 |
| 2023/0086087 A1 | 3/2023 | Shen et al. | |

FOREIGN PATENT DOCUMENTS

| | | |
|---|---|---|
| CN | 110418384 A | 11/2019 |
| CN | 110637477 A | 12/2019 |
| CN | 110691385 A | 1/2020 |
| CN | 111372327 A | 7/2020 |

OTHER PUBLICATIONS

3GPP TS 23.502 V0.1.1 (Jan. 2017);3rd Generation Partnership Project; Technical Specification Group Services and System Aspects;Procedures for the 5G System;Stage 2;(Release 15),total 46 pages.

3GPP TS 24.501 V0.1.0 (Nov. 2017);3rd Generation Partnership Project;Technical Specification Group Core Network and Terminals;Non-Access-Stratum (NAS) protocol for 5G System (5GS);Stage 3(Release 15);total 16 pages.

"3GPP TS 24.301 V11.0.0 3rd Generation Partnership Project; Technical Specification Group Core Network and Terminals;Non-Access-Stratum (NAS) protocolfor Evolved Packet System (EPS); Stage 3(Release 11), Technical Specification, Sep. 2011, 322 pages".

3GPP TS 23.272 V8.0.0 (Jun. 2008), 3rd Generation Partnership Project;Technical Specification Group Services and System Aspects;Circuit Switched Fallback in Evolved Packet System;Stage 2(Release 8),total 41 pages.

3GPP TS 24.229 V6.7.0 (Jun. 2005),3rd Generation Partnership Project; Technical Specification Group Core Network and Terminals;IP Multimedia Call Control Protocol based on Session Initiation Protocol (SIP) and Session Description Protocol (SDP);Stage 3(Release 6),dated Jun. 2005,total 296 pages.

* cited by examiner

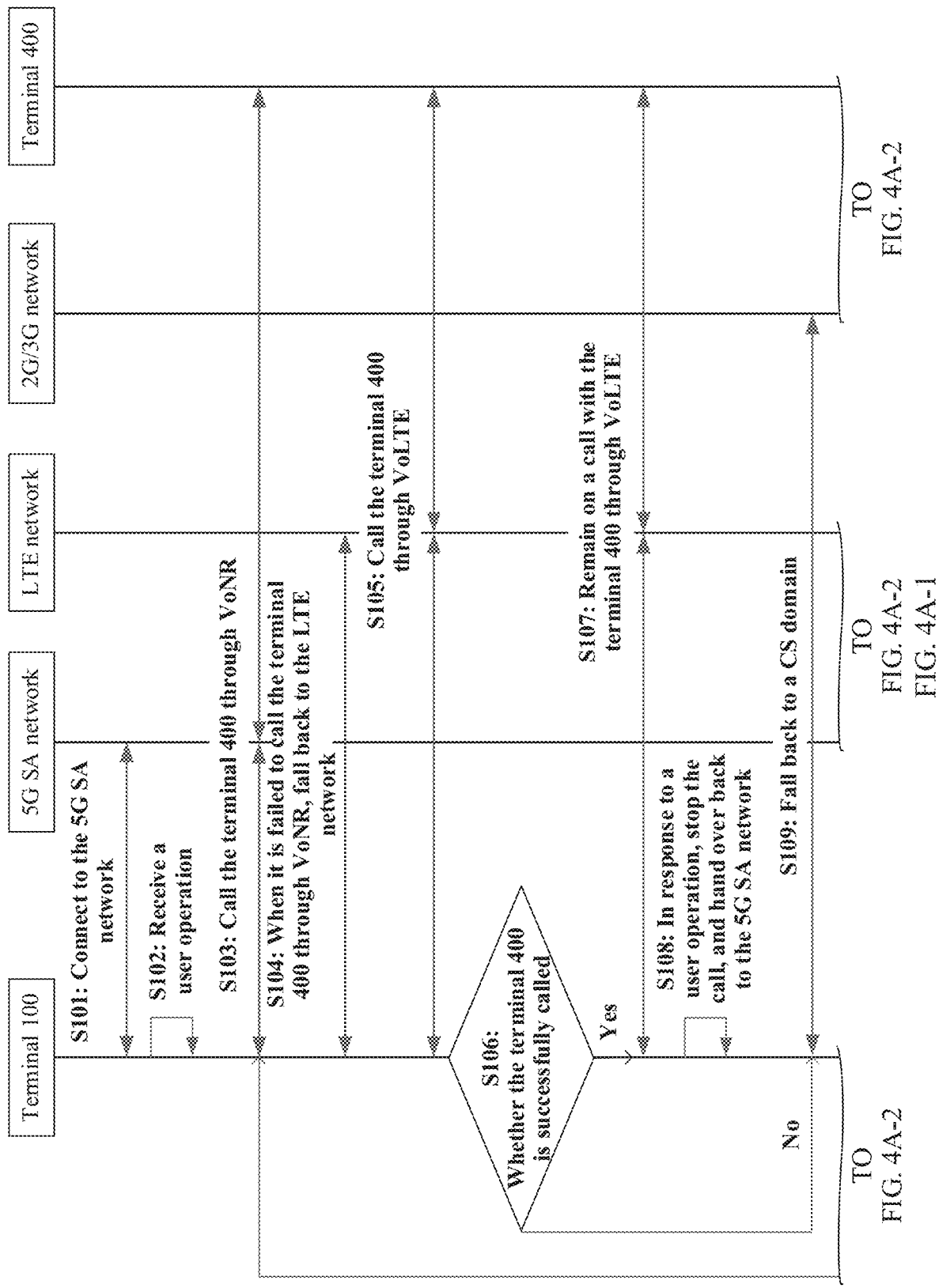

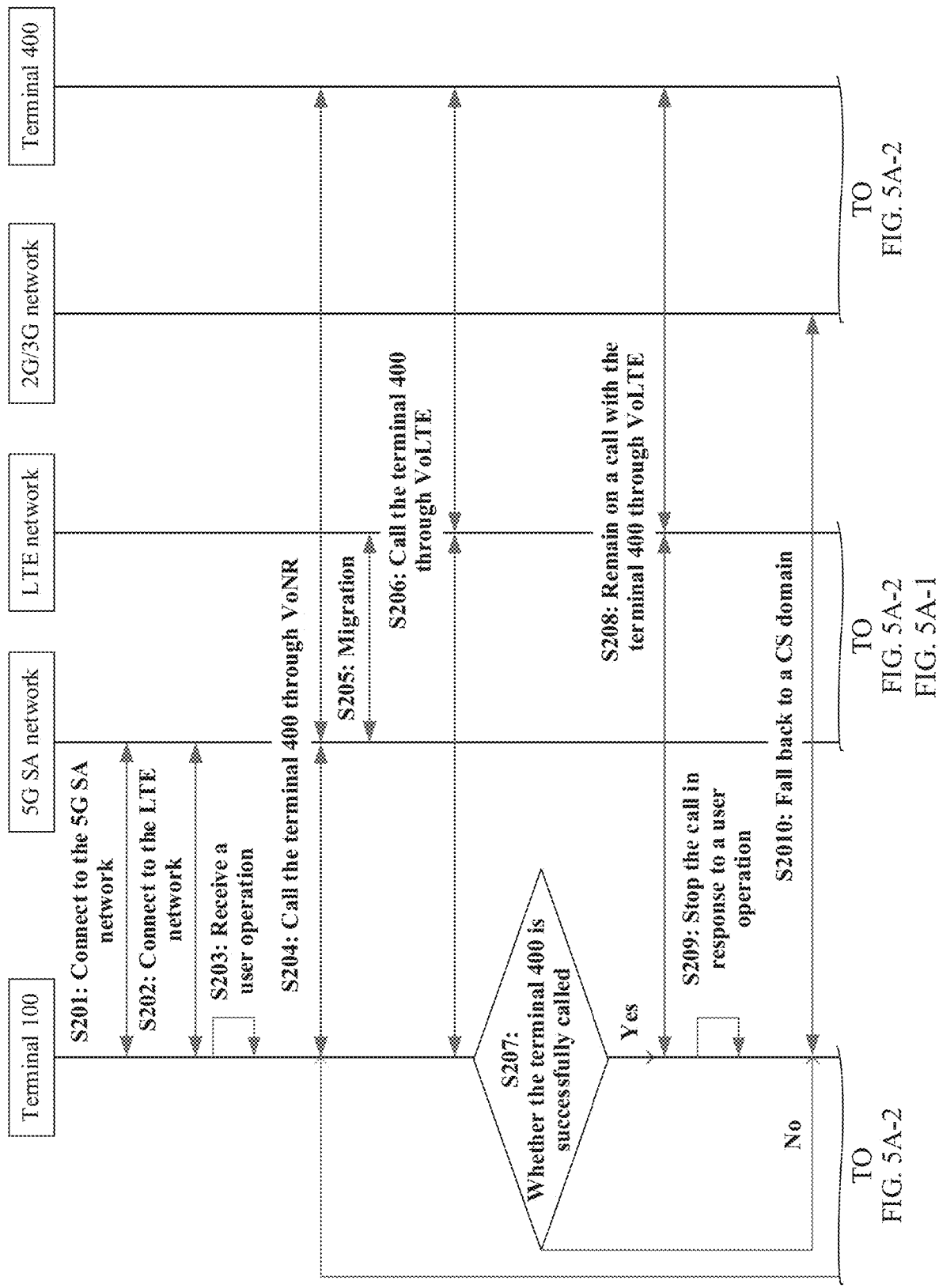

5G SA NETWORK-BASED CALL METHOD, ELECTRONIC DEVICE, AND SYSTEM

CROSS-REFERENCE TO RELATED APPLICATIONS

This is a U.S. National Stage of International Patent Application No. PCT/CN2021/075538 filed on Feb. 5, 2021, which claims priority to Chinese Patent Application No. 202010100415.1 filed on Feb. 18, 2020. Both of the aforementioned applications are hereby incorporated by reference in their entireties.

TECHNICAL FIELD

This application relates to a 5th generation mobile communication (5th generation mobile networks, 5G) technology and the call field, and in particular, to a 5G SA network-based call method, an electronic device, and a system.

BACKGROUND

With development of a 5G technology, the 3rd Generation Partnership Project (3rd generation partnership project, 3GPP) releases two 5G standards for deployment of a 5G SA network: standalone (standalone, SA) networking and non-standalone (non-standalone, NSA) networking. A 5G network using SA networking, namely, a 5G SA network, does not require a lot of transformation on a live network, provides better network performance and a better network service, and is the future development direction.

To meet users' demand for voice and video calls, the 5G SA network provides corresponding voice and video call services. To reduce network complexity, the 5G SA network no longer supports interworking with a conventional packet switched (circuited switched, CS) domain, but provides an audio/video call service through a connected Internet protocol multimedia subsystem (Internet protocol multimedia subsystem, IMS). A solution in which user equipment (user equipment, UE) obtains an audio/video call service on the 5G SA network through the IMS is also referred to as an IMS-based 5G voice over new radio (voice on new radio, VoNR) solution. The VoNR solution features short call establishment time and high-speed data service transmission, can provide better user experience, and is a target voice solution in the future.

When a terminal initiates a call (mobile originating call) to another terminal over VoNR, if the call fails, how to meet the users' demand for the voice and video calls and ensure audio and video call experience of the users is a current research focus.

SUMMARY

Embodiments of this application provide a 5G SA network-based call method, an electronic device, and a system, to ensure that a terminal successfully initiates a call to another terminal, meet a call demand of a user, and ensure call experience of the user.

According to a first aspect, an embodiment of this application provides a 5G SA network-based call method, applied to a terminal. The method may include: A first terminal connects to a first network device through an NR link, where a networking manner of the first network device is SA networking; in response to a received user operation, the first terminal calls a second terminal by using a VoNR technology, where data used when the first terminal calls the second terminal by using the VoNR technology is transmitted by the first network device in a form of an IP data packet through the NR link; when failing to call the second terminal, the first terminal stops connecting to the first network device through the NR link, connects to the second network device through an LTE link, and automatically calls the second terminal by using a VoLTE technology; and the first terminal prevents connecting to the first network device when automatically calling the second terminal by using the VoLTE technology, where data used when the first terminal calls the second terminal by using the VoLTE technology is transmitted by the second network device in a form of an IP data packet through the LTE link.

According to the method in the first aspect, when a call initiated by a terminal to another terminal by using the VoNR technology fails, the terminal may automatically initiate a call to the another terminal again by using the VoLTE technology. When initiating the call again by using the VoLTE technology, the terminal does not switch from connecting to the second network device to connecting to the first network device. In this way, it can be ensured that the terminal successfully initiates the call to the another terminal, a call demand of a user is met, and call experience of the user is ensured.

With reference to the first aspect, in some embodiments, the first terminal is in a single-registration mode. To be specific, the first terminal is configured with one set of radio frequency resources, and can connect to only one network device at a time.

With reference to the first aspect, in some embodiments, the first network device may include a 5G base station and a device in a 5GC, and the second network device may include a 4G base station and a device in an EPC.

With reference to the first aspect, in some embodiments, the first terminal may send a detach request to the first network device, and the first network device releases a context of the first terminal in response to the detach request, to stop connecting to the first network device through the NR link.

With reference to the first aspect, in some embodiments, the first terminal may connect to the second network device through the LTE link in the following two manners: 1. The first terminal may autonomously measure a signal sent by the second network device, and autonomously connect to the second network device through the LTE link. 2. The first terminal may report an LTE-related B1 event or B2 event to the first network device, and in response to the LTE-related B1 event or B2 event, the first network device triggers the first terminal to connect to the second network device through the LTE link in a handover or redirection manner.

With reference to the first aspect, in some embodiments, when automatically calling the second terminal by using the VoLTE technology, the first terminal prevents connecting to the first network device in the following two manners: 1. The first terminal may send a network capability message to the second network device in a process of connecting to the second network device through the LTE link, where the network capability message indicates that the first terminal does not support 5G. This manner is equivalent to hiding, by the first terminal, a capability of supporting 5G by the first terminal, so that a network side can be prevented from handing over the first terminal to the first network device. 2. After connecting to the second network device through the LTE link, when a reporting condition of an NR-related B1 event or B2 event is met, the first terminal does not report the NR-related B1 event or B2 event to the second network device. In this way, the network side can also be prevented from learning that a handover condition is currently met, and therefore the first terminal does not switch from connecting to the second network device to connecting to the first network device.

With reference to the first aspect, in some embodiments, when receiving error indication information, or when receiving, within first duration after calling the second terminal by using the VoNR technology, no response message sent by the second terminal, the first terminal may determine that the first terminal fails to call the second terminal. The response message may be an invite 180 message sent by the second terminal.

With reference to the first aspect, in some embodiments, after successfully calling the second terminal by using the VoLTE technology, the first terminal may further remain on a call with the second terminal. The second network device is further configured to transmit, in a form of an IP data packet through the LTE link, data generated during the call between the first terminal and the second terminal.

In some embodiments, after stopping the call with the second terminal, the first terminal may further stop connecting to the second network device through the LTE link, and connect to the first network device through the NR link. Herein, the first terminal may stop the call with the second terminal in response to a call hang-up operation. After stopping the call, the first terminal connects to the first network device, so that it can be ensured that the first terminal connects to a 5G SA network of an optimal standard in a subsequent running process, and a data transmission rate between the first terminal and a data network is increased, to improve user experience.

With reference to the first aspect, in some embodiments, when the first terminal fails to call the second terminal by using the VoLTE technology, the first terminal may stop connecting to the second network device through the LTE link, connect to a third network device through a 2G/3G link, and automatically call the second terminal through a CS domain, where data used when the first terminal calls the second terminal through the CS domain is transmitted by the third network device. In this way, a probability that the first terminal successfully calls the second terminal can be increased, and call experience of the user can be ensured.

In some embodiments, the third network device may include a 2G/3G base station, a device in a 2G/3G core network, or the like.

According to a second aspect, an embodiment of this application provides a terminal. The terminal includes a memory, one or more processors, and one or more communication modules. The memory is coupled to the one or more processors and the one or more communication modules, and is configured to store computer program code. The computer program code includes computer instructions, and the one or more processors invoke the computer instructions to enable the terminal to perform the method according to any one of the first aspect or the possible implementations of the first aspect.

According to a third aspect, an embodiment of this application provides a communication chip. The communication chip is applied to a terminal, and includes one or more processors and an interface. The interface is configured to receive code instructions and transmit the code instructions to the processor, and the processor is configured to run the code instructions, so that the terminal is enabled to perform the method according to any one of the first aspect or the possible implementations of the first aspect.

According to a fourth aspect, an embodiment of this application provides a communication system. The communication system includes a first terminal, a first network device, a second network device, and a second terminal. A networking manner of the first network device is SA networking. The first terminal is configured to perform the method in any one of the first aspect or the implementations of the first aspect. The first network device is configured to transmit, in a form of an IP data packet through an NR link, data used when the first terminal calls the second terminal by using a VoNR technology. The second network device is configured to transmit, in a form of an IP data packet through an LTE link, data used when the first terminal calls the second terminal by using a VoLTE technology.

With reference to the fourth aspect, in some embodiments, the communication system may further include a third network device. The third network device is configured to transmit, through a 2G/3G link, data used when the first terminal calls the second terminal through a CS domain.

According to a fifth aspect, an embodiment of this application provides a computer program product including instructions. When the computer program product runs on an electronic device, the electronic device is enabled to perform the method according to any one of the first aspect or the possible implementations of the first aspect.

According to a sixth aspect, an embodiment of this application provides a computer-readable storage medium including instructions. When the instructions are run on an electronic device, the electronic device is enabled to perform the method according to any one of the first aspect or the possible implementations of the first aspect.

According to a seventh aspect, an embodiment of this application provides a 5G SA network-based call method, applied to a terminal. The method may include: A first terminal connects to a first network device through an NR link, and connects to a second network device through an LTE link, where a networking manner of the first network device is SA networking; in response to a received user operation, the first terminal calls the second terminal by using a VoNR technology, where data used when the first terminal calls the second terminal by using the VoNR technology is transmitted by the first network device in a form of an IP data packet through the NR link; and when failing to call the second terminal, the first terminal automatically calls the second terminal again by using a VoLTE technology, where data used when the first terminal calls the second terminal by using the VoLTE technology is transmitted by the second network device in a form of an IP data packet through the LTE link.

With reference to the seventh aspect, in some embodiments, the first terminal is in a dual-registration mode. To be specific, the first terminal is configured with two sets of radio frequency resources. Therefore, the first terminal may connect to the first network device and the second network device at a time.

For the first network device and the second network device, refer to related descriptions in the first aspect.

With reference to the seventh aspect, in some embodiments, when the first terminal fails to call the second terminal, the first network device may first transfer a context of the first terminal to the second network device, and then the first terminal may automatically call the second terminal again by using the VoLTE technology.

With reference to the seventh aspect, in some embodiments, when receiving error indication information, or when receiving, within first duration after calling the second terminal by using the VoNR technology, no response message sent by the second terminal, the first terminal may determine that the first terminal fails to call the second terminal. The response message may be an invite 180 message sent by the second terminal.

With reference to the seventh aspect, in some embodiments, after successfully calling the second terminal by using the VoLTE technology, the first terminal may further remain on a call with the second terminal. The second network device is further configured to transmit, in a form of an IP data packet through the LTE link, data generated during the call between the first terminal and the second terminal.

With reference to the seventh aspect, in some embodiments, when the first terminal fails to call the second terminal by using the VoLTE technology, the first terminal may further stop connecting to the second network device through the LTE link, connect to a third network device through a 2G/3G link, and call the second terminal through a CS domain, where data used when the first terminal calls the second terminal through the CS domain is transmitted by the third network device. In this way, a probability that the first terminal successfully calls the second terminal can be increased, and call experience of the user can be ensured.

In some embodiments, the third network device may include a 2G/3G base station, a device in a 2G/3G core network, or the like.

According to an eighth aspect, an embodiment of this application provides a terminal. The terminal includes a memory, one or more processors, and one or more communication modules. The memory is coupled to the one or more processors and the one or more communication modules, and is configured to store computer program code. The computer program code includes computer instructions, and the one or more processors invoke the computer instructions to enable the terminal to perform the method according to any one of the seventh aspect or the possible implementations of the seventh aspect.

According to a ninth aspect, an embodiment of this application provides a communication chip. The communication chip is applied to a terminal, and includes one or more processors and an interface. The interface is configured to receive code instructions and transmit the code instructions to the processor, and the processor is configured to run the code instructions, so that the terminal is enabled to perform the method according to any one of the seventh aspect or the possible implementations of the seventh aspect.

According to a tenth aspect, an embodiment of this application provides a communication system. The communication system includes a first terminal, a first network device, a second network device, and a second terminal. A networking manner of the first network device is SA networking. The first terminal is configured to perform the method in any one of the seventh aspect or the implementations of the seventh aspect. The first network device is configured to transmit, in a form of an IP data packet through an NR link, data used when the first terminal calls the second terminal by using a VoNR technology. The second network device is configured to transmit, in a form of an IP data packet through an LTE link, data used when the first terminal calls the second terminal by using a VoLTE technology.

With reference to the tenth aspect, in some embodiments, the communication system may further include a third network device. The third network device is configured to transmit, through a 2G/3G link, data used when the first terminal calls the second terminal through a CS domain.

According to an eleventh aspect, an embodiment of this application provides a computer program product including instructions. When the computer program product runs on an electronic device, the electronic device is enabled to perform the method according to any one of the seventh aspect or the possible implementations of the seventh aspect.

According to a twelfth aspect, an embodiment of this application provides a computer-readable storage medium, including instructions. When the instructions are run on an electronic device, the electronic device is enabled to perform the method according to any one of the seventh aspect or the possible implementations of the seventh aspect.

According to the technical solutions provided in embodiments of this application, when a call initiated by the terminal to the another terminal by using the VoNR technology fails, the terminal may initiate a call to the another terminal again by using another voice solution. In this way, it can be ensured that the terminal successfully initiates the call to the another terminal, the call demand of the user is met, and the call experience of the user is ensured.

BRIEF DESCRIPTION OF DRAWINGS

FIG. 4A-1 and FIG. 4A-2 are a schematic flowchart of a 5G SA network-based call method according to an embodiment of this application;

FIG. 5A-1 and FIG. 5A-2 are a schematic flowchart of another 5G SA network-based call method according to an embodiment of this application;

DESCRIPTION OF EMBODIMENTS

Figure 1:
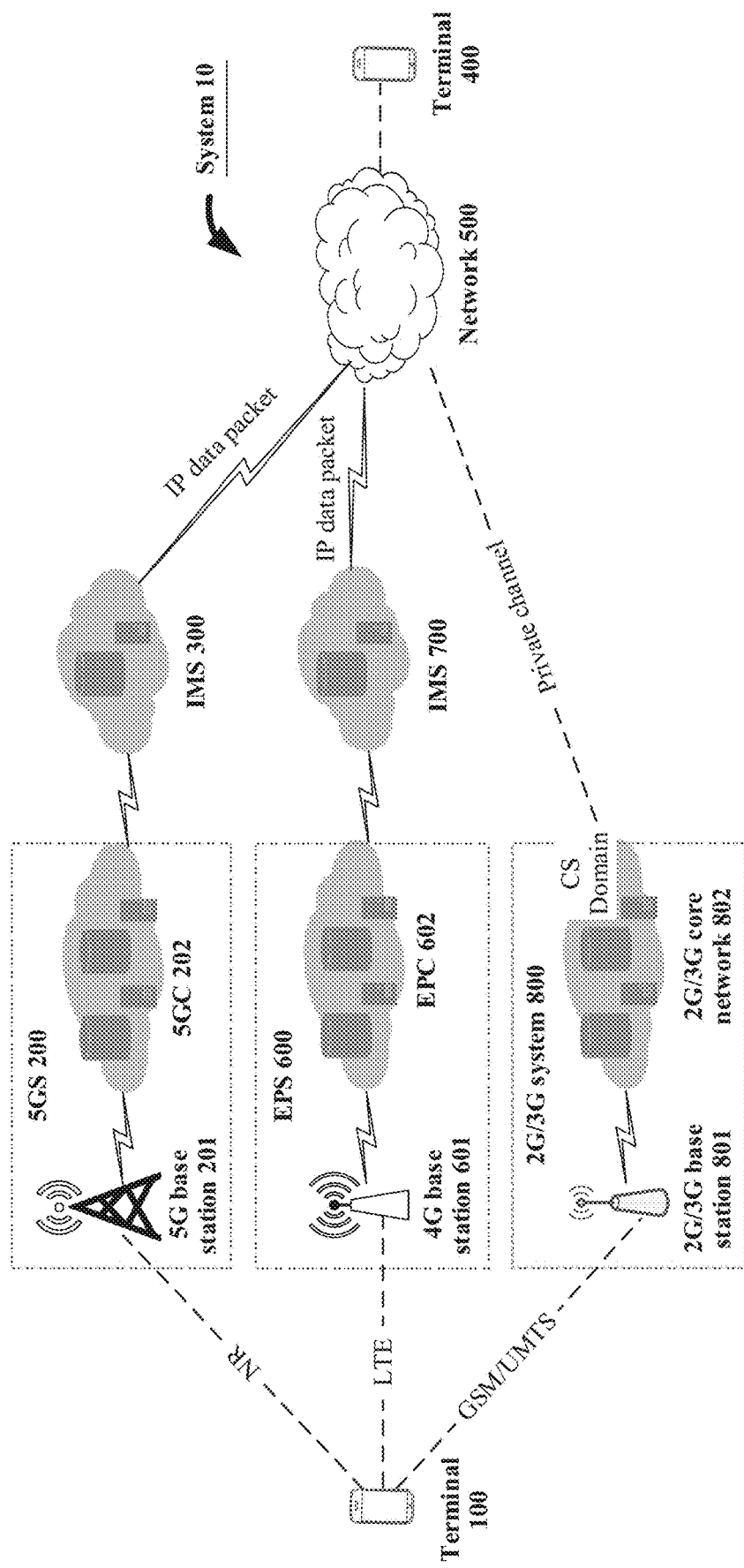
FIG. 1 is a schematic diagram of a structure of a communication system according to an embodiment of this application.

The following describes the technical solutions in embodiments of this application with reference to the accompanying drawings in embodiments of this application.

In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments of this application, unless otherwise stated, "a plurality of" means two or more than two.

Embodiments of this application provide a 5G SA network-based call method, an electronic device, and a system. In the 5G SA network-based call method, when a call initiated by a terminal to another terminal by using a VoNR technology fails, the terminal may initiate a call to the another terminal again by using another voice solution. In this way, it can be ensured that the terminal successfully initiates a call to the another terminal, a call demand of a user is met, and call experience of the user is ensured.

In the following embodiments of this application, a call is a process in which a terminal initiates an audio/video call request to another terminal. A terminal that initiates a call is a calling party, and another terminal that receives the call is a called party. After the called terminal accepts the call, the calling party and the called party can call each other. To be specific, multimedia data such as voice and video may be transmitted between the calling party and the called party, to provide multimedia services such as voice and video services for users of the two parties. During a call, an international mobile subscriber identity (international mobile subscriber identification number, IMSI) may be used as an identity between the calling party and the called party.

A call failure indicates that a terminal fails to call another terminal. For specific definitions of a call success and a call failure of the terminal, refer to related descriptions in subsequent embodiments. Details are not described herein.

In embodiments of this application, a voice solution used when the terminal initiates a call may include but is not limited to VoNR, an IMS-based voice on long term evolution solution (voice on long term evolution, VoLTE), a CS domain-based voice solution, VoWiFi, N3IWF, or the like. A specific implementation process of the foregoing voice solution is described in detail in a subsequent embodiment, Details are not described herein.

The following first describes a communication system 10 provided in an embodiment of this application.

FIG. 1 shows an example of an architecture of the communication system 10.

As shown in FIG. 1, the communication system 10 may include a terminal 100, a 5G system (5G system, 5GS) 200, and an IMS 300. The 5GS 100 is connected to the IMS 300.

The terminal 100 may include a smartphone (for example, a mobile phone running an Android system or an iOS system), a tablet computer, a notebook computer, a palmtop computer, a mobile Internet device (MID, mobile Internet device), a wearable device (for example, a smartwatch or a smart band), or another device that can access the Internet. The terminal may be referred to as UE.

The terminal 100 stores user information. The user information may include an IMSI, and may be stored in a subscriber identity module (subscriber identity module, SIM) card of the terminal 100. The terminal 100 may use the user information as an identity, initiate a call to another terminal by using various voice solutions, and perform audio/video communication after the another terminal accepts the call.

As shown in FIG. 1, the 5GS 200 is deployed in an SA manner. The 5GS 200 includes a 5G base station 201 and a 5G core network (5G core network, 5GC) 202. The 5G base station 201 is connected to the 5GC 202. The 5GC 202 is connected to the IMS 300.

The 5G base station 201 may be a next generation NodeB (next generation NodeB, gNB). The gNB may be connected to the terminal 100, and the gNB and the terminal 100 communicate with each other by using a new radio (new radio, NR) access technology. That is, the gNB communicates with the terminal 100 through an NR link.

The 5GC 202 is configured to exchange, forward, connect, and route data. A network element in the 5GC is a functional virtual unit, and may include but is not limited to a unit used for an access and mobility management function (access and mobility management function, AMF), a unit used for a session management function (session management function, SMF), a network element used for unified data management (unified data management, UDM), and the like.

The IMS 300 is configured to manage IP data packets into which multimedia data such as voice and video data is packaged, distinguish between a signaling part and a multimedia data part of the IP data packets, and transmit the multimedia data part of the IP data packets between the terminal 100 and a called party that is called by the terminal 100, to provide an audio/video service for the terminal 100. The IMS 300 may mainly include a call session control function (call session control function, CSCF) and a home subscriber server (home subscriber server, HSS). The CSCF is used to control signaling and authentication during a multimedia call session, and cooperate with another network entity to control a session. The HSS manages user data.

It may be understood that the 5GS 200 is connected to the IMS 300, the 5GS 200 may pack, into an IP data packet, multimedia data in a process in which the terminal 100 initiates a call and communication to the another terminal, and transmit the IP data packet to the another terminal through the IMS 300. To be specific, the 5GS can provide an IMS-based audio/video service in a circuit switch (circuit switch, PS) session. In other words, the 5GS supports VoNR. VoNR means that both control plane signaling (IMS signaling) and user plane data (IMS traffic) involved in a call process of two or more terminals are packed into IP data packets, and the IP data packets are transmitted between the terminals through the 5GS 200 and the IMS 300. The IP data packet is transmitted at a network layer.

Refer to FIG. 1. In some embodiments, the communication system 10 may further include a 4G system (evolved packet system, EPS) 600 and an IMS 700. The EPS 600 is connected to the IMS 700 to ensure that the EPS 600 supports VoLTE.

The EPS 600 includes a 4G base station 601 and a 4G core network (evolved packet core, EPC) 602. The 4G base station 601 is connected to the EPC 602. The EPC 602 is connected to the IMS 700.

The 4G base station 601 may be an evolved NodeB (evolved NodeB, eNB). In this embodiment of this application, the terminal 100 may be located in a signal coverage area of the 4G base station 601. The terminal 100 may be connected to the 4G base station 601, and communicate with the 4G base station 601 through an LTE link.

The EPC 602 mainly includes the following network elements: a mobility management entity (mobility management entity, MME), a serving gateway (serving gateway, SGW), a packet data network gateway (packet data network gateway, PGW), a home subscriber server (home subscriber server, HSS), an application server, and the like. Main functions of the MME include access control, mobility management, attach and detach, session management (for example, bearer establishment, modification, and release), and the like. The SGW is mainly configured to route and forward a data packet. Main functions of the PGW include a user-based packet filtering function, a lawful interception function, an IP address allocation function, and the like. The HSS is configured to store user subscription information, user subscription data, location information of a mobile user, and the like.

A structure and a function of the IMS 700 are similar to those of the IMS 300. For details, refer to related descriptions of the IMS 300. The IMS 700 and the IMS 300 may be a same IMS, or may be different IMSs. This is not limited in this embodiment of this application.

It may be understood that the EPS 600 is connected to the IMS 700, and the EPS 600 may pack, into an IP data packet, multimedia data in a process in which the terminal 100 initiates a call and communication to the another terminal, and transmit the IP data packet to the another terminal through the IMS 700. To be specific, the EPS 600 can provide an IMS-based audio/video service in a PS session. In other words, the EPS 600 supports VoLTE. VoLTE means that both control plane signaling and user plane data involved in a call process of two or more terminals are packed into IP data packets, and the IP data packets are transmitted between the terminals through the EPS 600 and the IMS 700.

Refer to FIG. 1. In some embodiments, the communication system 10 may further include a 2G/3G system 800. The 2G/3G system 800 may include a 2G/3G base station 801 and a 2G/3G core network 802.

The 2G base station may be a base transceiver station (base transceiver station, BTS), and the 3G base station may be a NodeB. The terminal 100 may be connected to the 2G/3G base station 801, and communicate with the 2G/3G base station 801 through a link, for example, a global system for mobile communications (global system for mobile communications, GSM) or a universal mobile telecommunications system (universal mobile telecommunications system).

The 2G/3G core network 802 includes a CS domain and a PS domain. The 2G/3G core network 802 is connected to a network 500.

Because the 2G/3G core network 802 includes the CS domain, the 2G/3G system 800 is capable of providing an audio/video service in a CS session. In other words, the 2G/3G system 800 supports a CS domain-based voice solution. The CS domain-based voice solution is to establish an exclusive channel between two or more terminals through the conventional CS domain, and perform audio/video communication through the channel.

Refer to FIG. 1. The communication system 10 may further include a terminal 400 and the network 500. The terminal 400 is connected to the network 500.

The terminal 400 may be a smartphone, a wearable device (for example, a smartwatch or a smart band), a tablet computer, a notebook computer, a fixed-line phone, or another device that can access the Internet.

The network 500 is connected to the IMS 300, the IMS 700, and the CS domain of the 2G/3G core network 802. The network 500 may include but is not limited to a 2G/3G network, an LTE network, a 5G SA network, an IMS, a public switched telephone network (public switched telephone network, PSTN), or the like. This is not limited in this embodiment of this application. Both signaling and data that are received or sent by the terminal 400 are transmitted through the network 500. For ease of description, a process of transmitting the signaling and data through the network 500 is not described in detail in the following embodiment.

In a subsequent embodiment, a 5G SA network-based call method provided in embodiments of this application is described by using an example in which the terminal 100 initiates a call to the terminal 400.

In an embodiment of this application, after a call initiated by the terminal 100 to the terminal 400 through VoNR fails, the terminal may initiate a call to the terminal 400 again through VoLTE.

VoNR means that the 5GS 200 bears call data during a call. That the terminal 100 calls the terminal 400 through VoNR means that the terminal 100 requests to pack, into an IP data packet through the 5GS 200 and the IMS 300, both control plane signaling (IMS signaling) and user plane data (MIS traffic) that are involved during a call between the terminal 100 and the terminal 400, and transmit the IP data packet. In this case, both service data and voice data related to the terminal 100 are transmitted in a form of an IP data packet.

VoLTE means that the EPS 600 bears call data during a call. That the terminal calls the terminal 400 through VoLTE means that the terminal 100 requests to pack, into an IP data packet through the EPS 600 and the IMS 700, both control plane signaling (IMS signaling) and user plane data (IMS traffic) that are involved during a call between the terminal 100 and the terminal 400, and transmit the IP data packet. In this case, both service data and voice data related to the terminal 100 are transmitted in a form of an IP data packet.

Figure 2:
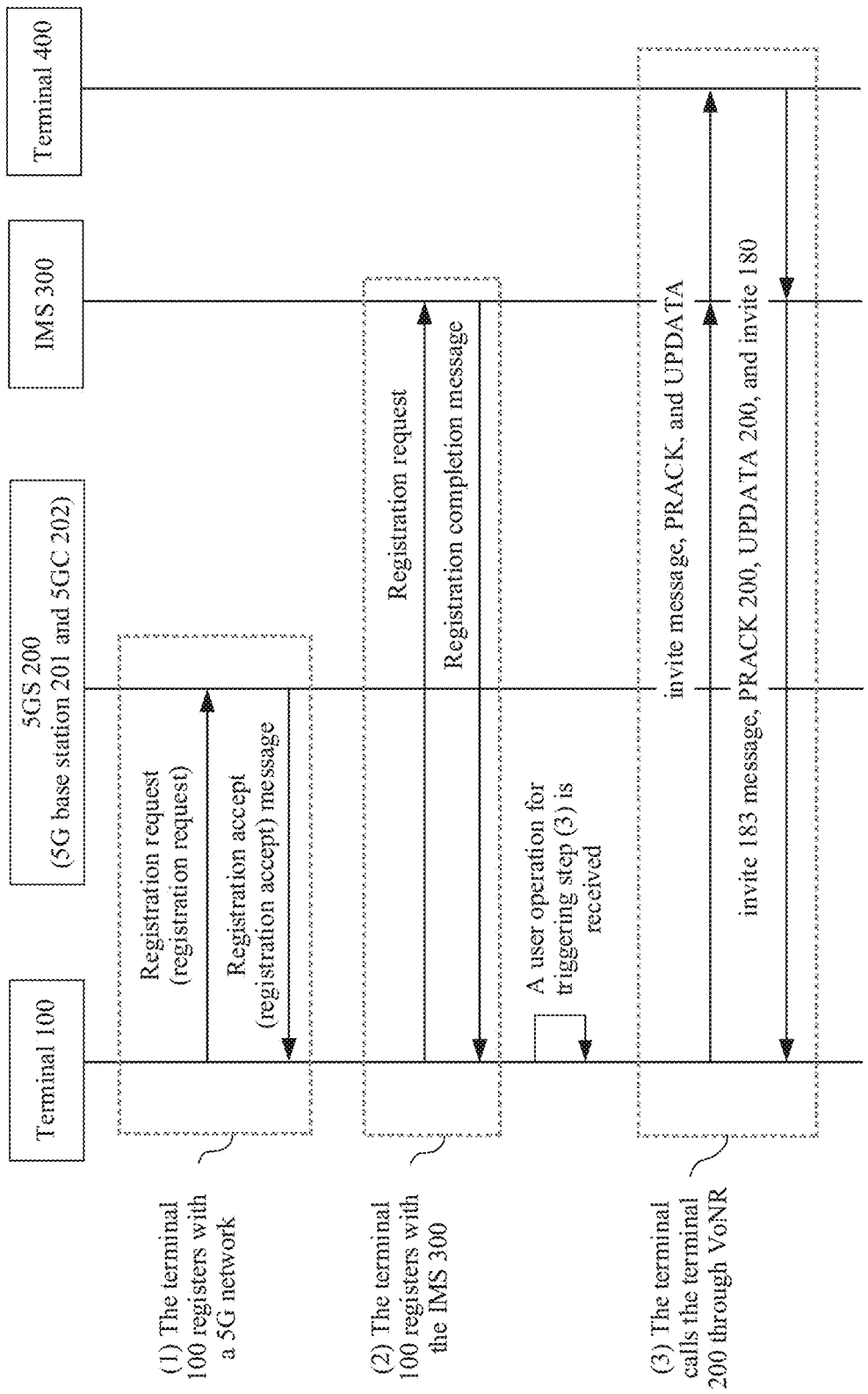
FIG. 2 is a schematic flowchart of calling, by a terminal, another terminal by using a VoNR technology according to an embodiment of this application.

The following describes in detail a process in which the terminal 100 calls the terminal 400 through VoNR, to clearly describe a concept in which the terminal 100 successfully calls the terminal 400 through VoNR. Refer to FIG. 2. The method includes the following steps.

(1) The terminal 100 connects to the 5G SA network.

Herein, a 5G SA network includes the 5G base station 201 and the 5GC 202.

In a process of connecting to the 5G SA network, the terminal 100 first connects to the 5G base station 201, and then attaches to and registers with the 5GC 202.

Specifically, the terminal 100 may first send a registration request (registration request) to the 5G SA network. The registration request carries information such as a capability, a registration type, and a security parameter of the terminal 100. The capability of the terminal 100 may include whether a handover (handover) to an evolved packet system (evolved packet system, EPS) is supported, whether a redirection (redirect) to an EPS is supported, and the like. Then, the 5G SA network verifies an identity of the terminal 100 based on the information provided by the terminal 100. After the verification succeeds, if the 5G SA network accepts the terminal 100, the 5G SA network feeds back a registration accept (registration accept) message to the terminal 100. The registration accept message may include an indication indicating whether the 5G SA network supports VoNR, whether the 5G SA network supports interworking based on an N26 interface, and the like.

After connecting to the 5G SA network, the terminal 100 may communicate with the 5GC 102, and use various services provided by the 5GC 102.

(2) The terminal 100 registers with an IMS through the 5G SA network.

Specifically, the terminal 100 first sends a registration request to the IMS 300. The registration request carries a user identifier (for example, an IMSI), user information, and the like of the terminal 100. Then, the IMS 300 performs authentication on the terminal 100 based on the information carried in the registration request, and delivers a registration complete message after determining that the terminal 100 is valid. That the terminal 100 is valid means that the terminal 100 has subscribed to an IMS service, that is, has permission to use an audio/video service provided by the IMS, for example, a multimedia service or an audio/video service.

After the terminal 100 connects to the 5G SA network and registers with the IMS 300, the terminal 100 may use a VoNR voice solution provided by the 5GS 200.

(3) The terminal 100 calls the terminal 400 through VoNR.

In this embodiment of this application, the terminal 100 may trigger step (3) in response to a received user operation. In other words, the terminal 100 may call the terminal 400 through VoNR in response to the user operation.

Figure 3A:
FIG. 3A and FIG. 3B show user interfaces implemented on a terminal according to an embodiment of this application.
Figure 3B:
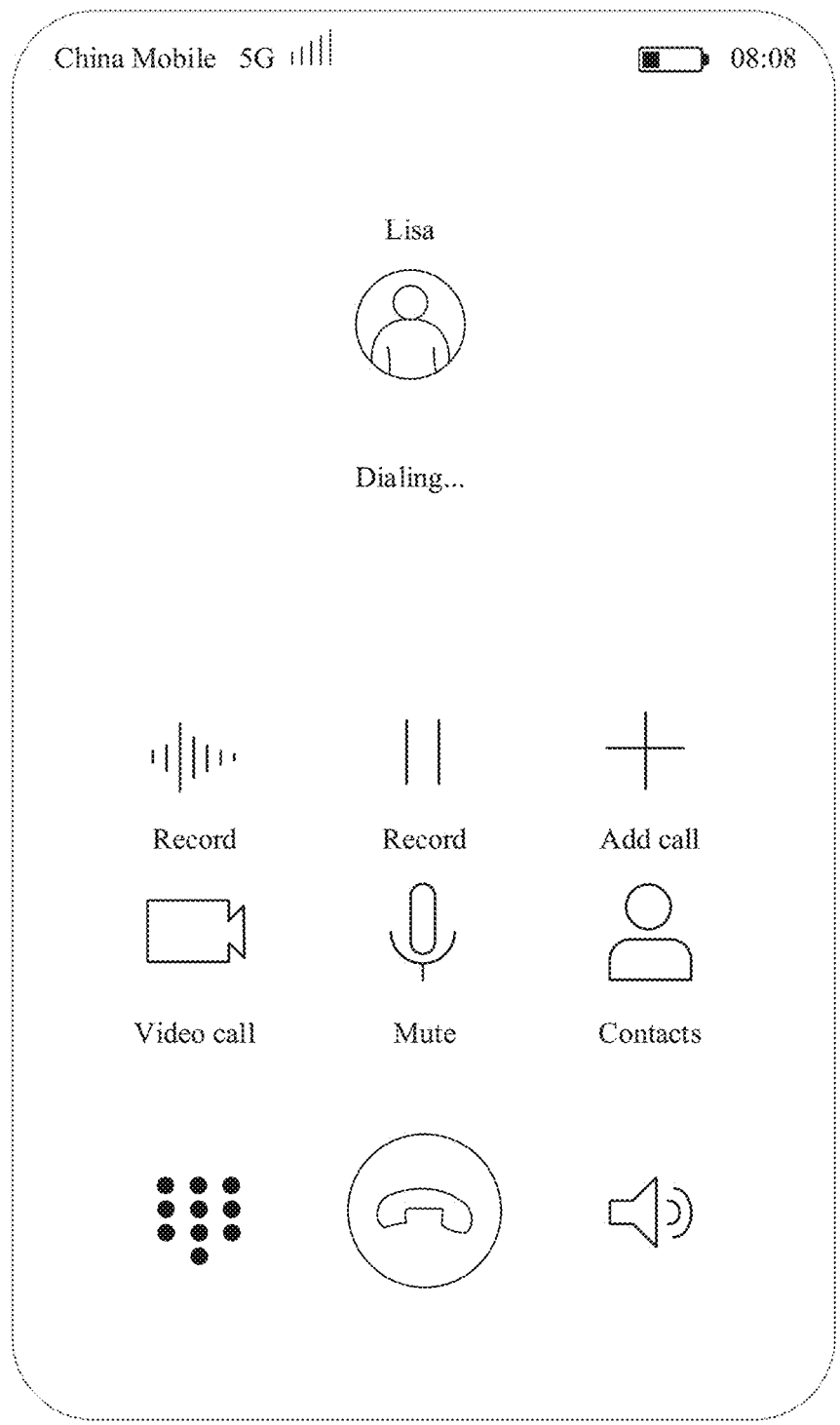

FIG. 3A and FIG. 3B show a possible user operation for triggering step (3).

FIG. 3A shows a user interface 30 displayed on a display of the terminal 100. The user interface 30 may be a recent call record interface of the terminal 100. The interface may include a status bar 301, a navigation bar 302 that can be hidden, a plurality of contact options, and the like. The plurality of contact options are options of contacts that have talked with an associated user of the terminal 100 in a recent period of time, and include an option of an associated user of the terminal 400, for example, "Lisa" 303. A user corresponding to user information (for example, an IMSI) stored in a terminal is an associated user of the terminal. The status bar 301 may include a name of an operator (for example, China Mobile), time, an identifier and signal strength of a network to which the terminal 100 connects, a current remaining battery level, and the like. The navigation bar 302 may include a back (back) button, a home (home) button, a multitasking button, and the like.

For example, as shown in FIG. 3A, the terminal 100 triggers step (3) in response to an operation (for example, a tap operation) received on the contact option "Lisa" 303, and displays a user interface 31 shown in FIG. 3B. The user interface 31 may be a voice call interface. The voice call interface may be used to prompt the user that the terminal 100 is calling the terminal 400.

FIG. 3A and FIG. 3B are only examples. In addition to the operation received on the contact option "Lisa" 303, the terminal 100 may further trigger step (3) in response to another user operation. For example, the terminal 100 may further trigger step (3) or the like in response to a user operation or a shaking operation received on an address book interface. This is not limited in this embodiment of this application.

In this embodiment of this application, a process in which the terminal 100 calls the terminal 400 through VoNR in step (3) may include the following steps.

1. The terminal 100 sends an invite message to the 5GC 202. The invite message may include an identifier (for example, an IMSI) of the terminal 400, a media type and an encoding scheme that are supported by the terminal 100, and the like. The identifier of the terminal 400 in the invite message may be used by the 5G SA network and the IMS 300 to page the terminal 400 in subsequent step 4.

2. The terminal 100 establishes a signaling radio bearer (signal radio bearer, SRB) 2, a quality of service class identifier (quality of service class identifier, QCI) 9 default bearer, and a QCI 5 session initiation protocol (session initiation protocol, SIP) signaling radio bearer.

3. The 5GC 202 receives the invite message sent by the terminal 100, and sends an answer message invite 100 to the terminal 100. The invite 100 indicates that the 5GC 202 is processing a call initiated by the terminal 100.

4. The 5GC 202 sends the invite message to the terminal 400, where the invite message is used to page the terminal 400.

5. The terminal 400 receives the invite message, and establishes an SRB 2 signaling radio bearer, a QCI 9 default bearer, and a QCI 5 SIP signaling radio bearer.

6. The 5GC 202 sends an invite message to the terminal 400.

7. The terminal 400 responds to the invite message.

8. The terminal 400 notifies the terminal 100 of a media type and an encoding scheme that are supported by the terminal 400.

9. The terminal 100 establishes a QCI 1 data radio bearer to bear multimedia data such as audio and videos.

10. The terminal 400 establishes a QCI 1 data radio bearer to bear multimedia data such as audio and videos.

11. The 5GC 202 indicates the terminal 100 to establish a bearer of QCI=1.

12. The terminal 100 receives an invite 183 message from the terminal 400.

13. The 5GC 202 indicates the terminal 400 to establish a bearer of QCI=1.

14. After receiving the invite 183 message from the terminal 400, the terminal 100 sends an acknowledgment message PRACK to start a resource reservation process.

15. After receiving the PRACK from the terminal 100, the terminal 400 returns a PRACK 200 response, and starts a resource reservation process.

16. After receiving the PRACK 200 response from the called party, the terminal 100 sends an UPDATE message, indicating that resource reservation on the calling party is successful.

17. After receiving the UPDATE message from the terminal 100, the terminal 400 learns that the resource reservation on the terminal 100 is successful, and sends UPDATE 200, indicating that resource reservation on the called party is successful.

18. The terminal 400 sends an invite 180 message to the terminal 100. The terminal 400 rings, and plays a ringback tone. In this case, the terminal 100 successfully calls the terminal 400. In other words, in some embodiments of this application, the terminal 100 may determine, based on whether the invite 180 message is received, whether the terminal 100 successfully calls the terminal 400 through VoNR. If the terminal 100 receives the invite 180 message, the terminal 100 successfully calls the terminal 400 through VoNR. If the terminal 100 does not receive the invite 180 message within specified time, the terminal 100 fails to call the terminal 400. In this embodiment of this application, the invite 180 message may also be referred to as a response message.

19. The terminal 400 is off-hook, and sends an invite 200 message to the terminal 100. In this case, an IMS session is successfully established between the terminal 100 and the terminal 400.

20. The terminal 100 communicates with the terminal 400 based on the IMS session. That is, the terminal 100 performs an audio/video call with the terminal 400 through VoNR.

It may be understood that steps 1 to 20 are simplified examples. In a specific implementation, the terminal 100 and the terminal 400 may include more or fewer signaling interactions. For details, refer to the standard TS24.229 provided by the 3GPP.

Simply, in steps 1 to 20, the terminal 100 and the terminal 400 first separately establish corresponding bearers, and then establish an IMS session based on the established bearers. It may be understood that a bearer is established between a terminal and a public data network (public data network, PDN). The bearer in this embodiment of this application includes a default bearer and a dedicated bearer. The default bearer includes a bearer of QCI=5, and is used to bear control signaling such as an invite message during a call. The dedicated bearer includes a bearer of QCI=1, is used to meet a quality of service (quality of service, QoS) requirement of multimedia data transmitted between the terminal 100 and the terminal 400, and is used to bear a voice packet and/or a video stream on a media plane. The IMS session is used to transmit audio/video data during a call between the terminal 100 and the terminal 400. In this process, after the terminal 400 sends the invite 180 message to the terminal 100, the terminal 100 successfully calls the terminal 400.

It may be understood that a process of initiating a call by the terminal 100 shown in FIG. 1 is a simplified example. In a specific implementation, the process includes more steps, and details are not described herein.

In this embodiment of this application, the call initiated by the terminal 100 to the terminal 400 through VoNR may fail. In other words, the IMS session may not be successfully established between the terminal 100 and the terminal 400. A cause for a failure of the call initiated by the terminal 100 to the terminal 400 through VoNR may include but is not limited to abnormal bearer release by a network side, a session initiation protocol (session initiation protocol, SIP) response failure, and the like. The SIP is a multimedia communication protocol at an application layer, and is used to create, modify, and release a session of one or more participants.

In this embodiment of this application, when the call initiated by the terminal 100 to the terminal 400 through VoNR fails, the terminal 100 may initiate a call to the terminal 400 again by using another voice solution. Herein, the another voice solution may include but is not limited to VoLTE, a CS domain-based voice solution, VoWiFi, an N3IWF, and the like.

In a subsequent embodiment, the 5G SA network-based call method provided in this embodiment of this application is described in detail by using an example in which the terminal 100 initiates a call to the terminal 400 again through VoLTE after the call initiated by the terminal 100 to the terminal 400 through VoNR fails.

In this embodiment of this application, the terminal 100 has two registration modes. Specifically, for a terminal that supports both a 5GC non-access stratum (non-access stratum, NAS) layer protocol and an EPC NAS layer protocol, a 5GS defines two registration modes: a single-registration mode (single-registration mode) and a dual-registration mode (dual-registration mode). It may be understood that only a terminal configured with two sets of radio frequency resources can enter the dual-registration mode. One set of radio frequency resources supports 4G, and the other set of radio frequency resources supports 5G. Herein, the radio frequency resource may include a modem (modem).

In the single-registration mode, the terminal can register with only the 5GC 202 or the EPC 602 at a time. To be specific, the terminal maintains only one active mobility management state at a time, which may be a registration management state of the 5GC 202 or a mobility management state of the EPC 602. In other words, the terminal accesses only one of the EPC 602 and the 5GC 202 at a time. It may be understood that, referring to FIG. 1, the 5GC and the EPC herein are different core networks, and the 5GC belongs to a core network in the 5G SA network.

In the dual-registration mode, the terminal may process registration procedures of the 5GC 202 and the EPC 602 at a time, and may register with the 5GC 202 and the EPC 602 at a time. In other words, the terminal may access both the 5GC 202 and the EPC 602 at a time. It may be understood that, referring to FIG. 1, the 5GC and the EPC herein are different core networks, and the 5GC belongs to a core network in the 5G SA network.

For the two registration modes of the terminal 100, the following separately describes the 5G SA network-based call method provided in this embodiment of this application.

Case (1): The terminal 100 is in the single-registration mode.

Figures 2, 4A:
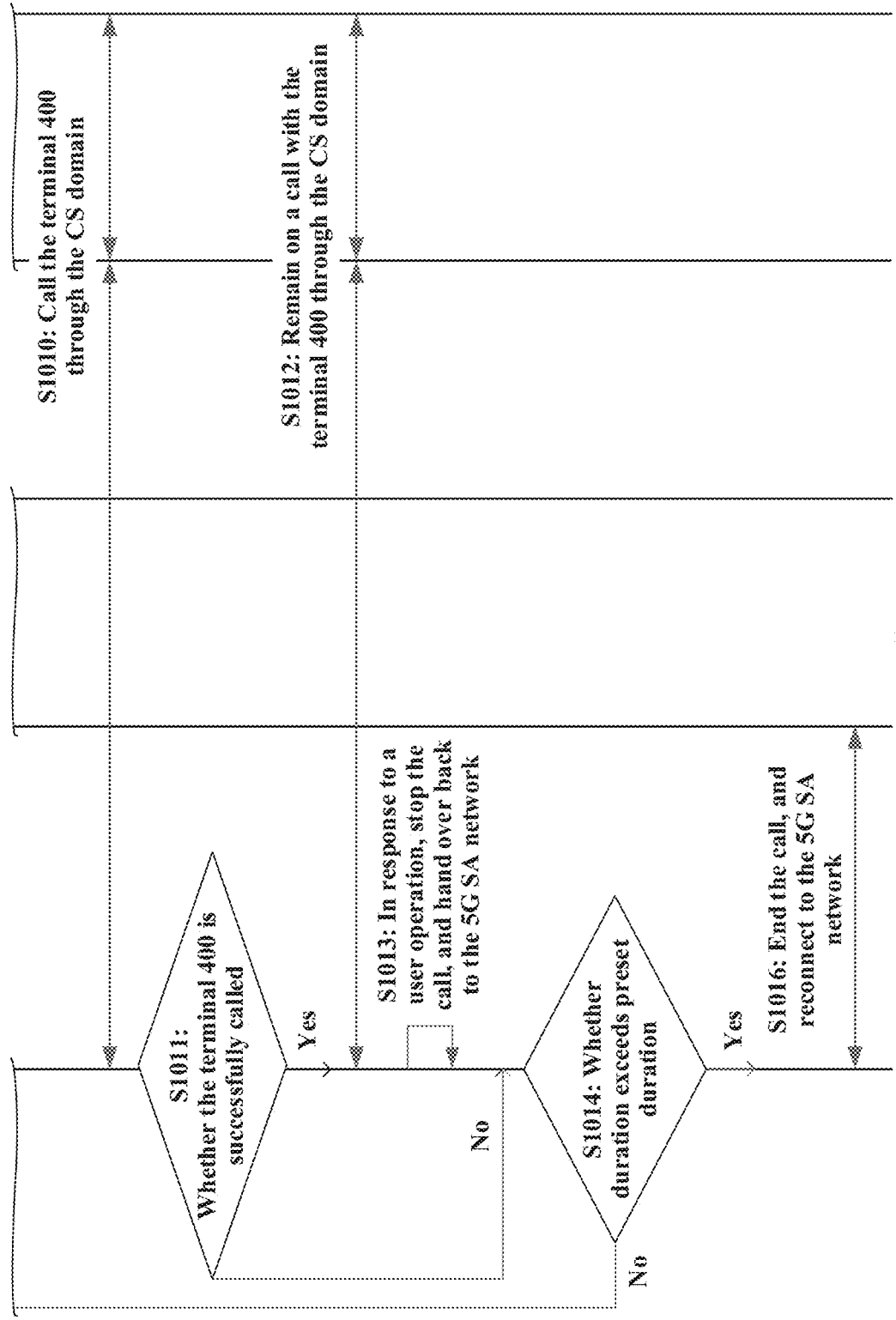

FIG. 4A-1 and FIG. 4A-2 are a schematic flowchart of the 5G SA network-based call method according to an embodiment of this application in case (1).

As shown in FIG. 4A-1 and FIG. 4A-2, the method includes the following steps.

S101: The terminal 100 connects to the 5G SA network and registers with the IMS 300. The 5G SA network supports VoNR.

Herein, for a specific implementation of S101, refer to related descriptions of step (1) and step (2) in FIG. 2. Details are not described herein again.

S102: The terminal 100 receives a user operation.

Herein, the user operation may be the operation that is used to trigger step (3) and mentioned in the foregoing embodiments in FIG. 2, FIG. 3A, and FIG. 3B. Refer to related descriptions. Details are not described herein again.

S103: In response to the user operation, the terminal 100 calls the terminal 400 through VoNR.

Herein, for a specific step in which the terminal 100 calls the terminal 400 through VoNR, refer to related descriptions in the embodiment in FIG. 2. Details are not described herein again. That the terminal 100 calls the terminal 400 through VoNR means that the terminal 100 requests to pack, into an IP data packet through the 5GS 200 and the IMS 300, both control plane signaling (IMS signaling) and user plane data (IMS traffic) that are involved during a call between the terminal 100 and the terminal 400, and transmit the IP data packet.

S104: When the terminal 100 fails to call the terminal 400 through VoNR, the terminal 100 connects to an LTE network. The LTE network supports VoLTE.

In this embodiment of this application, the terminal 100 may determine, in any one of the following cases, that the terminal 100 fails to call the terminal 400 through VoNR in step S103.

(1) The terminal 100 receives an error indication message, where the error indication information indicates that the terminal 100 fails to call the terminal 400. Specifically, refer to related descriptions in the embodiment in FIG. 2. In a process of calling the terminal 400 through VoNR, the terminal 100 may fail to call the terminal 400 due to various reasons. In this case, a corresponding node for learning the information sends the error indication information to the terminal 400. The node may be any device involved during communication between the terminal 100 and the terminal 400, for example, the 5G base station 201, the 5GC 202, the IMS 300, or the terminal 400. When receiving the error indication message, the terminal 100 determines that the terminal 100 fails to call the terminal 400 through VoNR in step S103.

The error indication message may be any one of SIP-based 3xx to 6xx messages. 3xx is a redirection message, indicating that a further action needs to be taken to complete a request. 4xx indicates a client error, indicating that the request contains a syntax error or cannot be satisfied on a current server. 5xx indicates a server error, indicating that the current server cannot process a clearly valid request. 6xx indicates a global fault, indicating that the request cannot be processed on any server.

(2) Starting from calling the terminal 400 through VoNR, that is, starting from step S103, the terminal 100 receives, within first duration T1, no invite 180 message sent by the terminal 400. In some embodiments, when the terminal 100 starts to call the terminal 400 through VoNR, the terminal 100 may start a timer whose duration is the first duration T1. When the timer expires and no invite 180 message sent by the terminal 400 is received, the terminal 100 determines that the terminal 100 fails to call the terminal 400 through VoNR in step S103.

In this embodiment of this application, the LTE network includes the 4G base station 601 and the EPC 602. That the terminal 100 connects to the LTE network means that the terminal 100 connects to the 4G base station 601, and attaches to and registers with the EPC 602.

Because the terminal 100 in the embodiment in FIG. 4A-1 and FIG. 4A-2 is in the single-registration mode, after registering with the EPC 602, the terminal 100 no longer connects to the 5GC 201. To be specific, after falling back from the 5G SA network to the LTE network (EPS fallback), the terminal 100 connects only to the LTE network, and no longer connects to the 5G SA network. In this embodiment of this application, the terminal 100 may actively initiate a detach (detach) process. For example, the terminal 100 may first send a detach request to the 5G SA network, and a 5G SA network device may release a context of the terminal 100 in response to the detach request.

The terminal 100 may fall back from the 5G SA network to the LTE network in the following two manners.

Manner (1): When failing to call the terminal 400 through VoNR, the terminal 100 may autonomously connect to the 4G base station 601, and register with the EPC 602.

Specifically, the terminal 100 may first disconnect from the 5G SA network, and then autonomously connect to the LTE network. Specifically, the terminal 100 may autonomously search for a cell of the 4G base station 601 on an LTE frequency band, and select the cell for camping. After camping on the cell of the 4G base station 601, the terminal 100 performs an RRC connection establishment (RRC connection establishment) process and a random access procedure (random access procedure) with the cell, to establish a connection to the cell, that is, connect to the 4G base station 601. After connecting to the 4G base station 601, the terminal 100 may register with the EPC 602, to use a service provided by the EPC 602. A process in which the terminal 100 registers with the EPC 602 is similar to a process in which the terminal 100 registers with the 5G SA network. For details, refer to related descriptions.

That is, the terminal 100 autonomously falls back from the 5G SA network to the LTE network in manner (1).

Manner (2): When failing to call the terminal 400 through VoNR, the terminal 100 may fall back to the LTE network under triggering of the 5G base station 201.

Specifically, when failing to call the terminal 400 through VoNR, the terminal 100 may report an LTE-related B1 event and/or B2 event to the 5G base station 201 based on a private threshold. The 5G base station 201 responds to the LTE-related B1 event and/or B2 event, and the terminal 100 falls back to the network under triggering of the 5G base station 201.

The LTE-related B1 event and B2 event are events used to start an inter-RAT handover. Herein, an inter-RAT is an LTE system. In the current technology, the terminal 100 reports the LTE-related B1 event when quality of a neighboring cell of the LTE network is higher than an absolute threshold 1. When quality of a serving cell of the 5G base station 201 to which the terminal 100 currently connects is less than an absolute threshold 2, and quality of the neighboring cell of the LTE network is greater than an absolute threshold 3, the terminal 100 reports the LTE-related B2 event.

However, in this embodiment of this application, the terminal 100 may set the private threshold, and the private threshold may be set as: The terminal 100 fails to call the terminal 400 through VoNR. To be specific, provided that the terminal 100 fails to call the terminal 400 through VoNR, the terminal 100 reports the LTE-related B1 event and/or B2 event to the 5G base station 201, so that the 5G base station 201 starts the inter-RAT handover, to trigger the terminal 100 to fall back from the 5G SA network to the LTE network.

In this embodiment of this application, the 5G base station 201 may trigger, based on a terminal capability and a network deployment status, the terminal 100 to fall back from the 5G SA network to the LTE, network in a handover (handover to LTE) manner or a redirection (redirect to LTE) manner. A specific manner used by the terminal 100 to fall back to the LTE network is determined by the 5G SA network.

When the handover (handover to LTE) manner is used, the terminal 100 disconnects from the 5G SA network after connecting to the LTE network. In this manner, air interface resource release is not involved, and efficiency is high. When the redirection manner (redirect to LTE) is used, the terminal 100 first disconnects from the 5G SA network, and then connects to the LTE network. In this manner, an air interface resource is released, and the air interface resource needs to be reestablished subsequently.

Compared with manner (1) in which the terminal 100 autonomously falls back to the LTE network, in manner (2), the 5G base station 201 triggers the terminal 100 to fall back to the LTE network, some information related to a connection of the terminal 100 to the LTE network may be directly sent by the EPC 602 (for example, the MME) or exchanged to the 5GC 202, so that operations on the terminal 100 can be reduced, and are simpler and faster.

In manner (1) or manner (2), the terminal 100 may fall back from the 5G SA network to the LTE network. Because the LTE network supports VoLTE, the terminal 100 may subsequently call the terminal 400 again through VoLTE. That is, the terminal may perform step S105.

It may be understood that, to enable the terminal 100 to subsequently initiate a call to the terminal 400 again through VoLTE, the terminal 100 needs to register with the IMS 700. Herein, the terminal 100 may initiate a tracking area update (tracking area update, TAU) procedure, to notify a 5G network of information change. An AMF in a 5G core network may migrate the context of the terminal 100 to an MME in a 4G network through an N26 interface. In this way, the terminal 100 may be changed from registering with the IMS 300 to registering with the IMS 700. The context of the terminal 100 includes information involved when the terminal 100 registers with the IMS 300.

Because the terminal 100 supports 5G and a SA networking manner, after the terminal 100 falls back from the 5G SA network to the LTE network, in some cases, the EPC 602 may trigger the terminal 100 to reconnect to the 5G SA network. That the terminal 100 supports 5G means that the terminal 100 supports a 5GC NAS layer protocol and a 5G frequency band. A case in which the EPC 602 may trigger the terminal 100 to reconnect to the 5G SA network may include but is not limited to: Network quality of the 5G SA network is better than network quality of the LTE network. For example, signal strength of the 5G base station 201 received by the 5G terminal 100 is greater than signal strength of the 4G base station 601 received by the 5G terminal 100.

To ensure that the terminal 100 can initiate a call to the terminal 400 through VoLTE, in some embodiments, the terminal may further prevent the EPC 602 from triggering the terminal 100 to reconnect to the 5G SA network in any one of the following manners.

Manner 1: In a process of falling back to the LTE network, the terminal 100 may send a network capability (UE network capability) message to the EPC 602 (for example, the MME). The network capability message indicates that the terminal 100 does not support 5G and the SA networking manner.

In manner 1, the EPC 602 considers that the terminal 100 does not support 5G and the SA networking manner, that is, does not trigger the terminal 100 to hand over from the LTE network to the 5G SA network.

In some embodiments, the terminal 100 may report the network capability message to the EPC 602 (for example, the MME) by using a process of attaching (attach) to the EPC 602 or a tracking area update (tracking area update, TAU) process. An information element (information element, IE) in the network capability message may include a bit "N1 mode". When the bit "N1 mode" is set to a first value (for example, 0), the network capability message indicates that the terminal 100 does not support 5G and the SA networking manner. Herein, that the terminal 100 sets the bit "N1 mode" to the first value max be considered as that the terminal 100 disables a capability (disable NR) of supporting a core network by the terminal 100.

Manner 2: After connecting to the LTE network, the terminal 100 suppresses reporting of an NR-related B1 event and/or B2 event.

Specifically, the NR-related B1 event and B2 event are events used to start the inter-RAT handover. Herein, an inter-RAT is a 5G system. To be specific, after the terminal 100 reports the NR-related B1 event or B2 event to the EPC 602, the EPC 602 triggers the terminal 100 to hand over from the LTE network to the 5G SA network. Specifically, the terminal 100 reports the NR-related B1 event when quality of a neighboring cell of the 5G SA network is higher than an absolute threshold 4. When quality of a serving cell of the LTE network to which the terminal 100 currently connects is less than an absolute threshold 5, and quality of a neighboring cell of the inter-RAT is greater than an absolute threshold 6, the terminal 100 reports the NR-related B2 event.

In manner 2, the terminal 100 suppresses reporting of the NR-related B1 event or B2 event. Even if a reporting condition is met currently, the terminal 100 does not report the NR-related B1 event or B2 event. In this way, the terminal 100 can be prevented from handing over from the LTE network to the 5G SA network under triggering of the EPC 602 after falling back from the 5G SA network to the LTE network.

When suppressing reporting of the NR-related B1 event or B2 event in manner 2, the terminal 100 may report the network capability message to the EPC 602 (for example, the MME) based on an actual situation. To be specific, when the bit "N1 mode" in the network capability message reported by the terminal 100 to the EPC 602 (for example, the MME) in the process of attaching to the EPC 602 or in the TAU process may be set to the second value (for example, 1), the network capability message indicates that the terminal 100 supports 5G and the SA networking manner.

S105: The terminal 100 calls the terminal 400 through VoLTE.

A process in which the terminal 100 calls the terminal 400 through VoLTE is similar to the process in which the terminal 100 calls the terminal 400 through VoNR in the embodiment in FIG. 1. Refer to related descriptions. That the terminal 100 calls the terminal 400 through VoLTE means that the terminal 100 requests to pack, into an IP data packet through the EPS 600 and the IMS 700, both control plane signaling (IMS signaling) and user plane data (IMS traffic) that are involved during a call between the terminal 100 and the terminal 400, and transmit the IP data packet.

Specifically, when the terminal 100 calls the terminal 400 through VoLTE, the terminal 100 and the terminal 400 separately establish corresponding bearers, and then establish an IMS session based on the established bearers. The bearer is a dedicated bearer, and is used to meet a quality of service (quality of service, QoS) requirement of multimedia data transmitted between the terminal 100 and the terminal 400.

In some embodiments, after the terminal 100 and the terminal 400 separately establish the dedicated bearers, an operation of preventing the EPC 602 from triggering the terminal 100 to hand over from the LTE network to the 5G SA network may be stopped. In this case, because both the terminal 100 and the terminal 400 have established the dedicated bearers, even if the terminal 100 hands over from the LTE network back to the 5G SA network, it can be ensured that the terminal 100 can call the terminal 400 through VoLTE. Specifically, after the terminal 100 and the terminal 400 separately establish the dedicated bearers, the terminal 100 may report the network capability message to the EPC 602 based on an actual situation, or may report the NR-related B1 event or B2 event to the EPC 602 based on a normal standard threshold rather than the private threshold.

S106: The terminal 100 determines whether the terminal 100 successfully calls the terminal 400 through VoLTE in step S105.

Herein, a reason why the terminal 100 fails to call the terminal 400 through VoLTE is similar to a reason why the terminal 100 fails to call the terminal 400 through VoNR. For details, refer to related descriptions in the foregoing embodiment.

In some embodiments, in a process described in step S105 in which the terminal 100 calls the terminal 400 through VoLTE, if the terminal 100 receives an invite 180 message sent by the terminal 400, the terminal 100 determines that the terminal 100 successfully calls the terminal 400 through VoLTE.

In some embodiments, a manner in which the terminal 100 determines that the terminal 100 fails to call the terminal 400 through VoLTE is similar to a manner in which the terminal 100 determines that the terminal 100 fails to call the terminal 400 through VoNR in step S104. Specifically, the terminal 100 may determine, in any one of the following cases, that the terminal 100 fails to call the terminal 400 through VoLTE in step S105.

(1) The terminal 100 receives an error indication message returned by the LTE network, where the error indication information indicates that the terminal 100 fails to call the terminal 400. Specifically, when calling the terminal 400 through VoLTE, the terminal 100 may fail to call the terminal 400 due to various reasons. In this case, a corresponding network element sends the error indication information to the terminal 400. The network element may be any network element involved during communication between the terminal 100 and the terminal 400, for example, the 4G base station 601, the EPC 602, the IMS 700, or the terminal 400.

(2) Starting from calling the terminal 400 through VoLTE, that is, starting from step S105, the terminal 100 receives, within second duration T2, no invite 180 message sent by the terminal 400. In some embodiments, when starting to call the terminal 400 through VoLTE, the terminal 100 may start a timer whose duration is the second duration T2. When the timer expires and no invite 180 message sent by the terminal 400 is received, the terminal 100 determines that the terminal 100 fails to call the terminal 400 through VoLTE.

S107: If the terminal 100 successfully calls the terminal 400 through VoLTE, the terminal 100 performs an audio/video call with the terminal 400 through VoLTE.

After the terminal 100 successfully calls the terminal 400 through VoLTE, an IMS session may be established between the terminal 100 and the terminal 400, and audio/video data may be transmitted based on the IMS session.

S108: In response to a call hang-up operation, the terminal 100 stops the audio/video call with the terminal 400, and reconnects to the 5G SA network. In other words, the terminal 100 hands over from the LTE network back to the 5G SA network, that is, hands over from the EPS 600 to the 5GS 200.

Specifically, the call hang-up operation may be an operation that is received by the terminal 100 during a call between the terminal 100 and the terminal 400 and used to hang up the call, or an operation that is received by the terminal 400 during the call between the terminal 100 and the terminal 400 and used to hang up the call. The operation may be an operation performed on a "Hang-up" control on a call screen displayed by the terminal 100 or the terminal 400, for example, a tap operation. That is, the associated user of the terminal 100 may hang up the call, or the associated user of the terminal 400 may hang up the call.

It may be understood that, after the terminal 100 receives the call hang-up operation, the dedicated bearer between the terminal 100 and the PDN is released. The release of the dedicated bearer is triggered by the network side. In this embodiment of this application, a manner in which the terminal 100 hands over from the LTE network back to the 5G SA network is similar to the manner in which the terminal 100 falls back from the 5G SA network to the LTE network in step S104, and may include a manner of autonomously connecting to the 5G SA network and a manner of connecting to the 5G SA network under triggering of the network side. When triggered by the network side, the terminal 100 may connect to the 5G SA network in a handover (handover) manner or a redirection (redirect) manner. For a specific implementation step, refer to related descriptions in step S104. Details are not described herein again.

According to step S108, it can be ensured that the terminal 100 connects to a 5G SA network of an optimal standard in a running process after performing the audio/video call with the terminal 400 through VoLTE, to improve a data transmission rate between the terminal 100 and a data network, so as to improve user experience.

S109: If the terminal 100 fails to call the terminal 400 through VoLTE, the terminal 100 connects to a 2G/3G network.

In this embodiment of this application, the 2G/3G network includes the 2G/3G base station 801 and the 2G/3G core network 802. That the terminal 100 connects to the 2G/3G network means that the terminal 100 connects to the 2G/3G base station 801, and attaches to and registers with the 2G/3G core network 802.

Because the terminal 100 in the embodiment of FIG. 4A-1 and FIG. 4A-2 is in the single-registration mode, after registering with the 2G/3G core network 802, the terminal 100 no longer connects to the EPC 602. In other words, the terminal 100 falls back from the LTE network to a CS domain (CS fallback, CSFB). The terminal 100 may fall back from the LTE network to the CS domain in the following two manners.

(1) The terminal 100 sends an extended service request (extended service request) to the EPC 602 (for example, the MME), where the extended service request is used to request to fall back to the CS domain. If the EPC 602 (for example, the MME) accepts the extended service request, the EPC 602 triggers the terminal 100 to fall back to the CS domain.

In some embodiments, the terminal 100 may perform fallback cell measurement, and send a measurement report to the 4G base station 601 based on a measurement result. The measurement report may include an identifier, signal strength, and the like that are of a cell and measured by the terminal 100, and may be used by the EPS 602 to determine a manner in which the terminal 100 falls back to the CS domain.

In this embodiment of this application, the EPC 602 may trigger, based on one or more of the terminal capability, the network deployment status, or the measurement report, the terminal 100 to fall back from the LTE network to the CS domain in the handover (handover to CS) manner or the redirection (redirect to CS) manner. It may be understood that the terminal 100 may fall back to the 2G network in the redirection (redirect) manner, or fall back to the 3G network in the handover (handover) manner. In some embodiments, the EPC 602 may indicate, based on an RRC release message sent to the terminal 100, the terminal 100 to fall back from the LTE network to the CS domain in the handover manner or the redirection manner.

(2) The terminal 100 sends an extended service request (extended service request) to the EPC 602 (for example, the MME), where the extended service request is used to request to fall back to the CS domain. If the EPC 602 (for example, the MME) rejects the extended service request, the terminal 100 autonomously falls back to the CS domain.

Specifically, after receiving a message that is sent by the EPC 602 (for example, the MME) and used to reject the extended service request, the terminal 100 may autonomously connect to the 2G/3G base station 801 based on a pre-stored specified frequency, and register with the 2G/3G core network 802. The pre-stored specified frequency is an operating frequency of the 2G/3G network.

S1010: The terminal 100 calls the terminal 400 through the CS domain.

That the terminal 100 calls the terminal 400 through the CS domain means that the terminal 100 requests to establish an exclusive channel with the terminal 400 through the conventional CS domain, and requests to transmit audio/video data through the channel.

S1011: The terminal 100 determines whether the terminal 100 successfully calls the terminal 400 through the CS domain in step S1010.

In some embodiments, when the terminal 100 calls the terminal 400 through the CS domain, if the terminal 100 receives an invite 180 message sent by the terminal 400, the terminal 100 determines that the terminal 100 successfully calls the terminal 400 through the CS domain.

In some embodiments, when receiving error indication information returned by the 2G/3G network, or when no invite 180 message sent by the terminal 400 is received within third duration T3 since the terminal 100 calls the terminal 400 through the CS domain, that is, after step S1010, the terminal 100 may determine that the terminal 100 fails to call the terminal 400 through the CS domain. Herein, a reason why the terminal 100 fails to call the terminal 400 through the CS domain is similar to the reason why the terminal 100 fails to call the terminal 400 through VoNR. For details, refer to related descriptions in the foregoing embodiment.

S1012: If the terminal 100 successfully calls the terminal 400 through the CS domain, the terminal 100 performs an audio/video call with the terminal 400 through the CS domain.

Specifically, after the terminal 100 successfully calls the terminal 400 through the CS domain, the exclusive channel may be established between the terminal 100 and the terminal 400, and audio/video data may be transmitted through the channel.

S1013: In response to a call hang-up operation, the terminal 100 stops the audio/video call with the terminal 400, and reconnects to the 5G SA network.

For the call hang-up operation in step S1013, refer to the call hang-up operation in step S108.

Specifically, the terminal 100 may first hand over from the 2G/3G network to the LTE network, and then hand over from the LTE network to the 5G SA network. A specific operation of handing over the terminal 100 from the 2G/3G network to the LTE network is similar to the manner in which the terminal 100 falls back from the LTE network to the CS domain in step S109. Specifically, the terminal 100 may redirect (redirect) to the LTE network under triggering of the 2G network, and hand over (handover) to the LTE network under triggering of the 3G network. In addition, the terminal 100 may also fall back to the CS domain in an autonomous network search manner. For a manner of handing over the terminal 100 from the LTE network to the 5G SA network, refer to step 108.

According to step S1013, it can be ensured that the terminal 100 connects to the 5G SA network of the optimal standard in the running process after performing the audio/video call with the terminal 400 through the CS domain, to improve the data transmission rate between the terminal 100 and the data network, so as to improve user experience.

S1014: If the terminal 100 fails to call the terminal 400 through the CS domain, determine whether duration from step S103 to a current time point exceeds preset duration.

S1015: If the duration from step S103 to the current time point does not exceed the preset duration, steps S103 to S1015 are cyclically performed until the terminal 100 successfully calls the terminal 400.

Specifically, the terminal 100 may hand over from the CS domain to the 5G SA network, that is, reconnect to the 5G SA network, and perform S103 to S1015 again.

According to step S1015, the terminal 100 may ensure to successfully call the terminal 400 as far as possible within the preset duration, to ensure call experience of the user.

S1016: If the duration from step S103 to the current time point exceeds the preset duration, no longer call the terminal 400, and reconnect to the 5G SA network.

According to step S1016, it can be ensured that the terminal 100 connects to the network of the optimal standard in the subsequent running process, to improve the data transmission rate between the terminal 100 and the data network, so as to improve user experience.

In this embodiment of this application, starting from that the terminal 100 performs step S103 for the first time, if the terminal 100 fails to call the terminal 400 within the preset duration, the terminal 100 no longer calls the terminal 400, and outputs prompt information. The prompt information indicates that the terminal 100 fails to call the terminal 400. For example, the prompt information may be a prompt tone "the call fails" played by the terminal 100, or may be a text "The call fails" displayed on a display, or the like. In this way, accurate feedback may be provided to a user through the prompt information, so that the user can learn, within the preset duration, whether the terminal 100 successfully calls the terminal 400 currently, to improve user experience.

According to the 5G SA network-based call method shown in FIG. 4A-1 and FIG. 4A-2, the terminal 100 is in the single-registration mode. When a call initiated by the terminal 100 to another terminal through VoNR fails, the terminal 100 may initiate a call to the another terminal again through VoLTE. In this way, it can be ensured that the terminal successfully initiates a call to the another terminal, a call demand of the user is met, and call experience of the user is ensured.

According to the method shown in FIG. 4A-1 and FIG. 4A-2, the user needs to perform only one dialing operation, the terminal 100 can initiate a call to the terminal 400 for a plurality of times, and a subsequently initiated call does not require user intervention. This solution increases a probability of successful dialup, is almost imperceptible to the user, and provides good user experience.

In some embodiments, when performing the method shown in FIG. 4A-1 and FIG. 4A-2, the terminal 100 may hand over between networks of different standards. When the terminal 100 hands over to different networks, the terminal 100 may display a corresponding network identifier and a corresponding signal strength indicator in a status bar displayed on the display. In this way, the user may be notified of a type and signal strength of a network to which the terminal 100 currently connects.

The network identifier may be implemented as a visual interface element, for example, a character, an icon, or a text. For example, a network identifier of the 4G network may be a character "4G", a character "LTE", or the like, and a network identifier of the 5G network may be a character "5G", a character "NR", or the like. The signal strength indicator indicates strength of a signal received by the terminal 100 from a network device (for example, a gNodeB or an eNodeB).

Figure 4B:
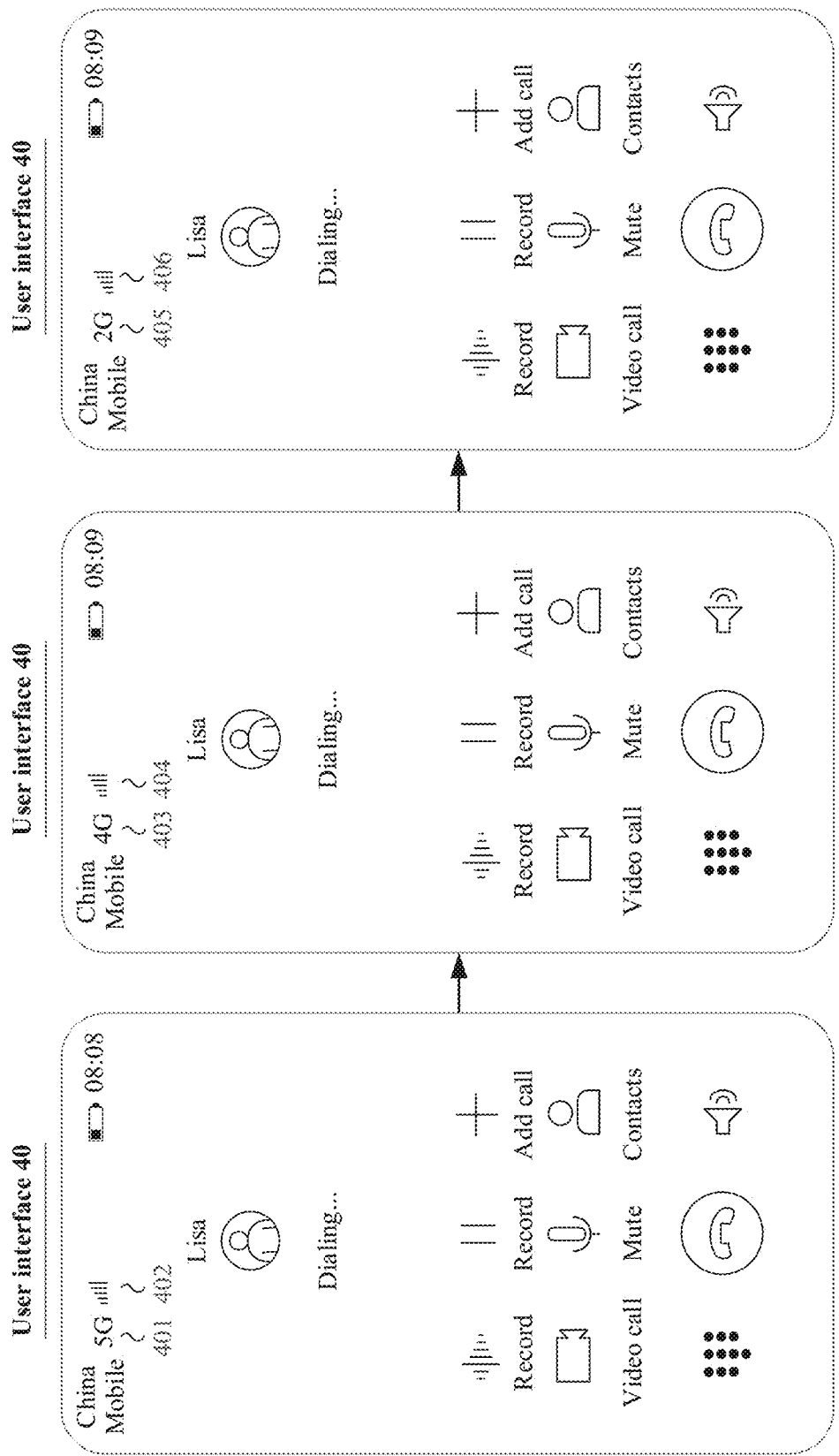
FIG. 4B shows user interfaces displayed when a terminal implements the method shown in FIG. 4A-1 and FIG. 4A-2 according to an embodiment of this application.

FIG. 4B shows an example of changes of the status bar displayed on the display when the terminal 100 performs the method shown in FIG. 4A-1 and FIG. 4A-2.

As shown in FIG. 4B, when performing steps S101 to S103, the terminal 100 connects to the 5G SA network. In this case, the status bar displays a network identifier 401 and a signal strength indicator 402 of the 5G network.

When performing steps S104 to S107, the terminal 100 connects to the LTE network. In this case, the status bar displays a network identifier 403 and a signal strength indicator 404 of the 4G network.

When performing steps S109 to S1012, the terminal 100 connects to the 5G SA network. In this case, the status bar displays a network identifier 405 and a signal strength indicator 406 of the 2G/3G network.

Case (2): The terminal 100 is in the dual-registration mode.

Figures 2, 5A:
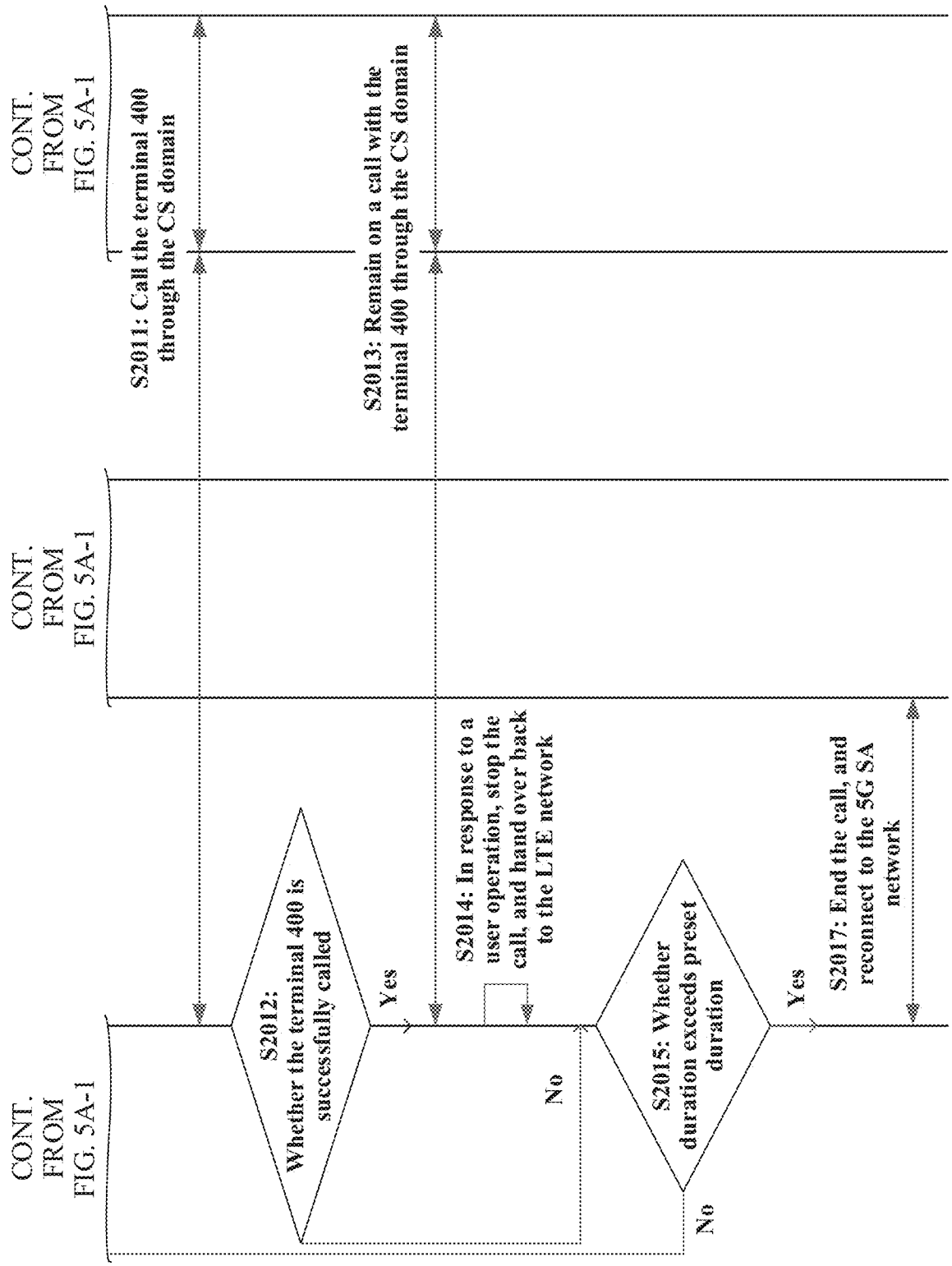

FIG. 5A-1 and FIG. 5A-2 are a schematic flowchart of the 5G SA network-based call method according to an embodiment of this application in case (2).

As shown in FIG. 5A-1 and FIG. 5A-2, the method includes the following steps.

S201: The terminal 100 connects to the 5G SA network and registers with the IMS 300. The 5G SA network supports VoNR.

S202: The terminal 100 connects to the LTE network and registers with the IMS 700. The LTE network supports VoLTE.

Because the terminal is in the dual-registration mode, the terminal 100 may register with both a 5GC and an EPC. In other words, the terminal 100 may access both the 5G SA network and the LTE network.

A sequence of performing step S201 and step S202 is not limited in this application.

Step S201 is the same as S101 in the embodiment in FIG. 4A-1 and FIG. 4A-2. Refer to related descriptions. A specific implementation of step S202 in which the terminal connects to the LTE network and registers with the IMS 700 is similar to a specific implementation of step S202 in which the terminal 100 connects to the 5G SA network and registers with the IMS 300. Refer to related descriptions. Details are not described herein again.

S203: The terminal 100 receives a user operation.

S204: In response to the user operation, the terminal 100 calls the terminal 400 through VoNR.

S205: When the terminal 100 fails to call the terminal 400 through VoNR, migrate, from a 5G network to the LTE network, signaling and data that are transmitted when the terminal 100 calls the terminal 400 through VoNR.

Specifically, a resource occupied in the 5G network when the terminal 400 calls the terminal 400 through VoNR may include a PDU session (PDU session) used to transmit a protocol data unit (protocol data unit, PDU) data packet between the terminal 100 and the IMS 300. The PDU data packet is transmitted at a data link layer. The PDU data packet is used to bear control plane signaling and user plane data involved during a call between the terminal 100 and the terminal 400.

The terminal 100, the 5G SA network, and the LTE network may cooperate with each other to migrate, to a PDN session (PDN session) in LTE, signaling and data that are originally born in a PDU session, so that the signaling and data can be born in the PDN session in LTE.

In other words, when the terminal 100 fails to call the terminal 400 through VoNR, a context of the terminal 100 is migrated from the 5GC 202 to the EPC 602. The context of the terminal 100 may include related information of the terminal 100, for example, a network capability, authentication information, a security algorithm, created connection information (such as an APN, a PGW, and a QCI), and bearer information of the terminal 100.

S206: The terminal 100 calls the terminal 400 through VoLTE.

S207: The terminal 100 determines whether the terminal 100 successfully calls the terminal 400 through VoLTE in step S105.

S208: If the terminal 100 successfully calls the terminal 400 through VoLTE, the terminal 100 performs an audio/video call with the terminal 400 through VoLTE.

For steps S206 to S208, refer to S105 to S107 in the embodiment in FIG. 4A-1 and FIG. 4A-2.

S209: In response to a call hang-up operation, the terminal 100 stops the audio/video call with the terminal 400.

S2010: If the terminal 100 fails to call the terminal 400 through VoLTE, the terminal 100 connects to a 2G/3G network.

Because the terminal 100 in the embodiment in FIG. 4A-1 and FIG. 4A-2 is in the dual-registration mode and connects to the 5G SA network, in step S210, the terminal 100 switches from connecting to the LTE network to connecting to the 2G/3G network, and maintains a connection to the 5G network.

S2011: The terminal 100 calls the terminal 400 through a CS domain.

S2012: The terminal 100 determines whether the terminal 100 successfully calls the terminal 400 through the CS domain in step S1010.

S2013: If the terminal 100 successfully calls the terminal 400 through the CS domain, the terminal 100 performs an audio/video call with the terminal 400 through the CS domain.

S2014: In response to a call hang-up operation, the terminal 100 stops the audio/video call with the terminal 400, and reconnects to the LTE network. That is, the terminal 100 hands over from the 2G/3G network back to the LTE network.

S2015: If the terminal 100 fails to call the terminal 400 through the CS domain, determine whether duration from step S204 to a current time point exceeds preset duration.

S2016: If the duration from step S204 to the current time point does not exceed the preset duration, steps S204 to S2016 are cyclically performed until the terminal 100 successfully calls the terminal 400.

S2017: If the duration from step S204 to the current time point exceeds the preset duration, no longer call the terminal 400, and reconnect to the LTE network.

For steps S2010 to S2013, refer to S109 to S1012 in the embodiment of FIG. 4A-1 and FIG. 4A-2. For step S2015, refer to S1014 in the embodiment of FIG. 4A-1 and FIG. 4A-2.

According to the 5G SA network-based call method shown in FIG. 5A-1 and FIG. 5A-2, the terminal 100 is in the dual-registration mode. When a call initiated by the terminal 100 to another terminal through VoNR fails, the terminal 100 may initiate a call to the another terminal again through VoLTE. In this way, it can be ensured that the terminal successfully initiates a call to the another terminal, a call demand of a user is met, and call experience of the user is ensured.

According to the method shown in FIG. 5A-1 and FIG. 5A-2, the user needs to perform only one dialing operation, the terminal 100 can initiate a call to the terminal 400 for a plurality of times, and a subsequently initiated call does not require user intervention. This solution increases a probability of successful dialup, is almost imperceptible to the user, and provides good user experience.

In some embodiments, when performing the method shown in FIG. 5A-1 and FIG. 5A-2, the terminal 100 may hand over between networks of different standards. When the terminal 100 hands over to different networks, the terminal 100 may display a corresponding network identifier and a corresponding signal strength indicator in a status bar displayed on the display. In this way, the user may be notified of a type and signal strength of a network to which the terminal 100 currently connects. For implementation forms of the network identifier and the signal strength indicator, refer to related descriptions in the embodiment in FIG. 4B.

Figure 5B:
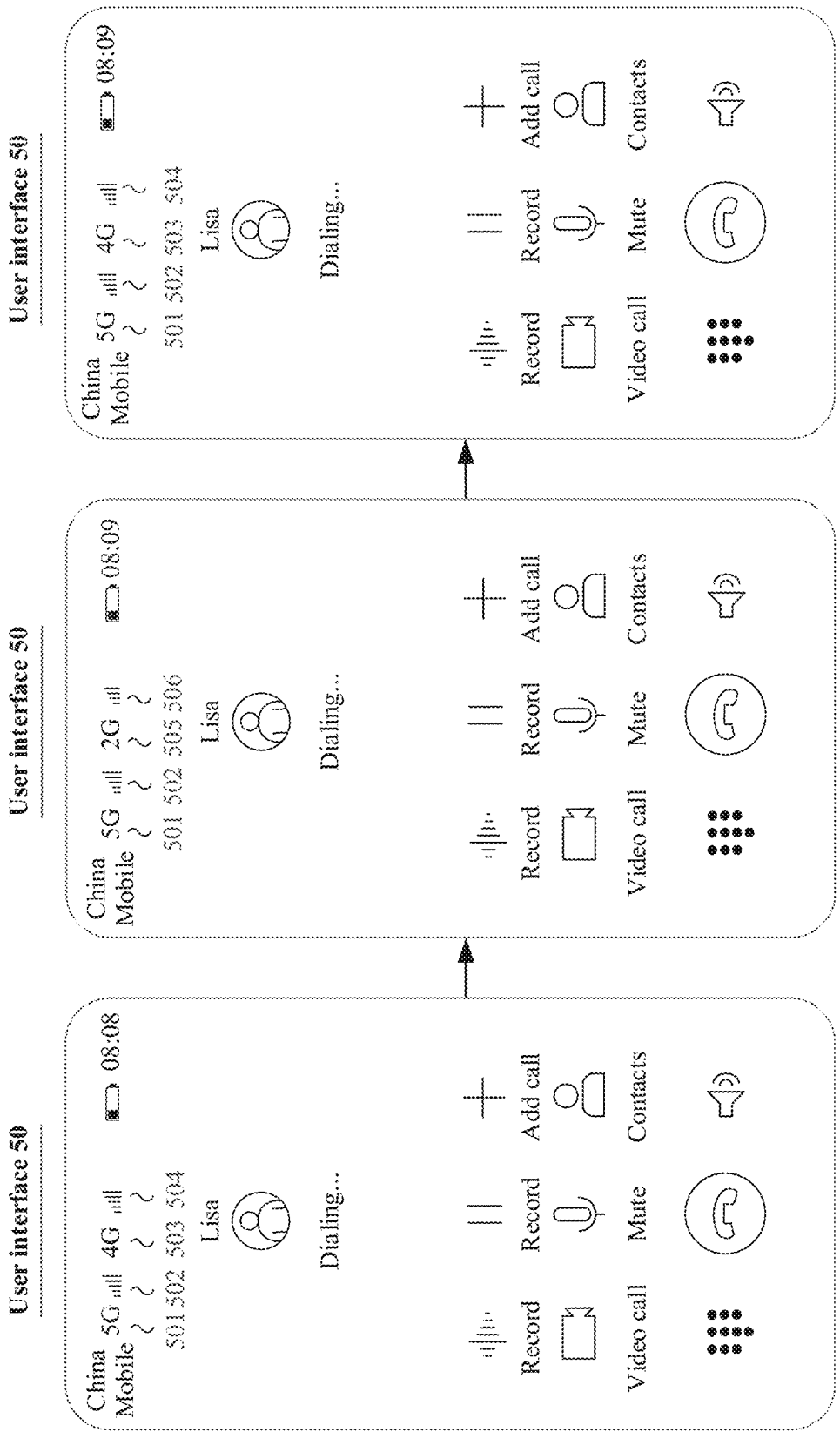
FIG. 5B shows user interfaces displayed when a terminal implements the method shown in FIG. 5A-1 and FIG. 5A-2 according to an embodiment of this application.

FIG. 5B shows an example of changes of the status bar displayed on the display when the terminal 100 performs the method shown in FIG. 5A-1 and FIG. 5A-2.

As shown in FIG. 5B, when performing steps S203 to S209, the terminal 100 connects to both the 5G SA network and the LTE network. In this case, a network identifier 501 and a signal strength indicator 502 of the 5G network, and a network identifier 503 and a signal strength indicator 504 of the 4G network are displayed in the status bar.

When performing steps S2010 to S2013, the terminal 100 connects to both the 5G SA network and the 2G/3G network. In this case, the network identifier 501 and the signal strength indicator 502 of the 5G network, and a network identifier 505 and a signal strength indicator 506 of the 2G/3G network are displayed in the status bar.

When performing step S2014 or S2017, the terminal 100 connects to both the 5G SA network and the LTE network. In this case, the network identifier 501 and the signal strength indicator 502 of the 5G network, and the network identifier 503 and the signal strength indicator 504 of the 4G network are displayed in the status bar.

In the foregoing embodiments of FIG. 4A-1 and FIG. 4A-2 and FIG. 5A-1 and FIG. 5A-2, an example in which after the call initiated by the terminal 100 to the terminal 400 through VoNR fails, the terminal 100 initiates a call to the terminal 400 again through VoLTE is used to describe embodiments of this application. It may be understood that, in the 5G SA network-based call method provided in embodiments of this application, after the call initiated by the terminal 100 to the terminal 400 through VoNR fails, the terminal 100 may alternatively initiate a call to the terminal 400 again by using another voice solution, A brief description is provided in the following.

In the communication system shown in FIG. 1, addition to accessing the core network through a 3GPP access network, for example, accessing the 5GC 202 through the 5G base station 201 and accessing the EPC 602 through the 4G base station 601, the terminal 100 may alternatively access the core network through a non-3GPP (Non-3GPP) access network.

For example, the terminal 100 may alternatively access the 5GC 202 by using an N3IWF (Non-3GPP inter working function). To be specific, the terminal 100 may alternatively initiate a call to the terminal 400 again by using the N3IWF, and after the terminal 400 accepts the call, communicate with the terminal 400 by using the N3IWF. That the terminal 100 calls the terminal 400 by using the N3IWF means that the terminal 100 requests to communicate with the terminal 400 by using the N3IWF That the terminals communicate with each other by using the N3IWF means that both control plane signaling (IMS signaling) and user plane data (IMS traffic) involved during a call between two or more terminals are packed into IP data packets, and the IP data packets are transmitted between the terminals by using the N3IWF, the 5GC 202, and the IMS 300.

For another example, the terminal 100 may alternatively access the EPC 602 through a network. To be specific, the terminal 100 may alternatively initiate a call to the terminal 400 again through VoWiFi, and after the terminal 400 accepts the call, communicate with the terminal 400 through VoWiFi. That the terminal 100 calls the terminal 400 through VoWiFi means that the terminal 100 requests to communicate with the terminal 400 through VoWiFi. That the terminals communicate with each other through VoWiFi means that both control plane signaling (IMS signaling) and user plane data (IMS traffic) involved during a call between two or more terminals are packed into IP data packets, and the IP data packets are transmitted between the terminals through the Wi-Fi network, the EPC 602, and the IMS 700.

Therefore, in this embodiment of this application, after the call initiated by the terminal 100 to the terminal 400 through VoNR fails, the terminal 100 may initiate a call to the terminal 400 again through VoLTE, the CS domain-based voice solution, VoWiFi, the N3IWF, and the like. If the terminal 100 still fails to call the terminal 400, the terminal 100 may initiate a call to the terminal 400 again by using a different voice solution, until the call succeeds or times out. In this way, it can be ensured as much as possible that the terminal 100 successfully initiates a call to another terminal, to meet a call demand of the user, and ensure call experience of the user.

The following describes, by using two specific embodiments, the 5G SA network-based call method provided in this application.

Figure 6A:
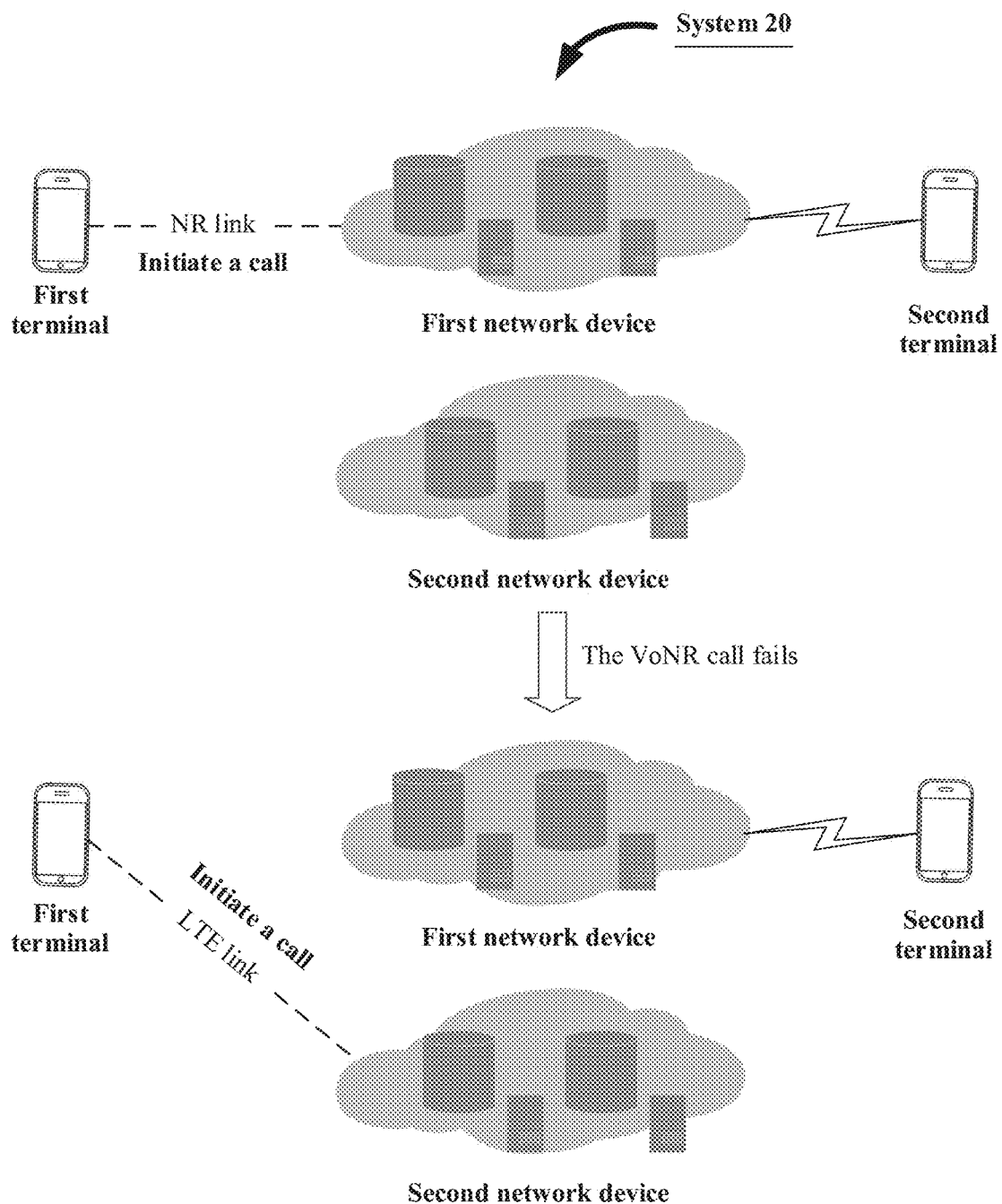
FIG. 6A is a scenario diagram of implementing a 5G SA network-based call method when a terminal is in a single-registration mode according to an embodiment of this application.

FIG. 6A is a diagram of a scenario in which a terminal in a single-registration mode performs a 5G SA network-based call method according to an embodiment of this application. As shown in FIG. 6A, a communication system 20 includes a first terminal, a first network device, a second network device, and a second terminal. The first terminal may first connect to the first network device through an NR link, and in response to a received user operation, call the second terminal through VoNR. When failing to call the second terminal through VoNR, the first terminal stops connecting to the first network device through the NR link, connects to the second network device through an LTE link, and then calls the second terminal again through VoLTE. Data used when the first terminal calls the second terminal through VoNR is transmitted by the first network device in a form of an IP data packet through the NR link. Data used when the first terminal calls the second terminal through VoLTE is transmitted by the second network device in a form of an IP data packet through the LTE link. In other words, when the first terminal is in the single-registration mode, if the first terminal fails to call the second terminal through VoNR, the first terminal falls back to an LTE network and calls the second terminal again through VoLTE.

In FIG. 6A, a networking manner of the first network device is SA networking. The communication system 20 may be a simplified communication system 10. A first terminal, a second terminal, a first network device, and a second network device in the communication system 10 may be respectively the terminal 100, the terminal 400, a device in the 5G SA network (including a 5G base station and a device in a 5GC), and a device in the LTE network (including a 4G base station and a device in an EPC) mentioned in the foregoing embodiments.

It may be understood that for a specific implementation of the call method of the terminal in the single-registration mode described in FIG. 6A, refer to the foregoing related descriptions in FIG. 4A and FIG. 4B.

Figure 6B:
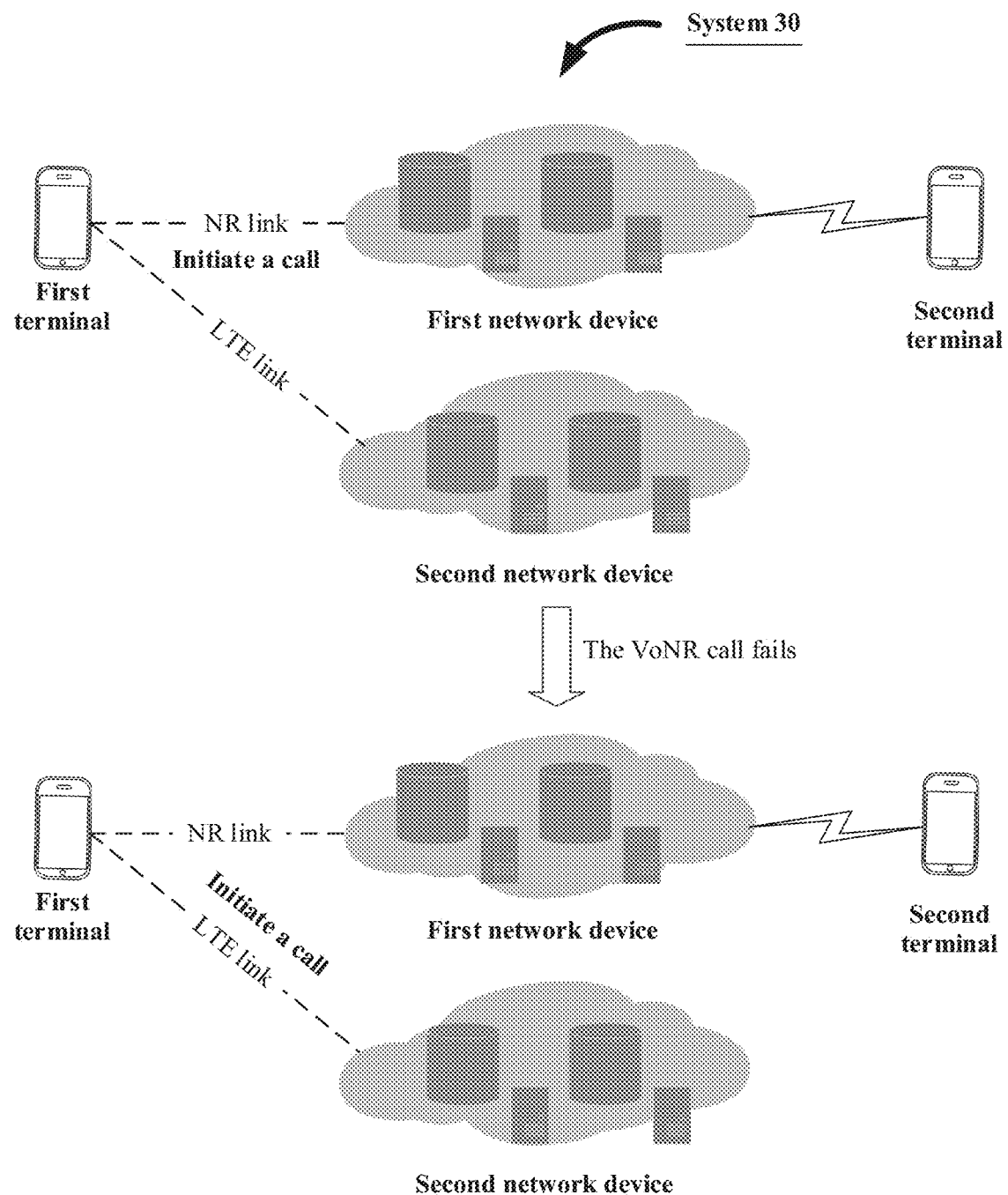
FIG. 6B is a scenario diagram of implementing a 5G SA network-based call method when a terminal is in a dual-registration mode according to an embodiment of this application.

FIG. 6B is a diagram of a scenario in which a terminal in a dual-registration mode performs a 5G SA network-based call method according to an embodiment of this application. As shown in FIG. 6A, a communication system 30 includes a first terminal, a first network device, a second network device, and a second terminal. A networking manner of the first network device is SA networking. The first terminal may connect to the first network device through an NR link, and connect to the second network device through an LTE link. In response to a received user operation, the first terminal calls the second terminal through VoNR. When the first terminal fails to call the second terminal through VoNR, the first terminal calls the second terminal again through VoLTE. Data used when the first terminal calls the second terminal through VoNR is transmitted by the first network device in a form of an IP data packet through the NR link. Data used when the first terminal calls the second terminal through VoLTE is transmitted by the second network device in a form of an IP data packet through the LTE link. To be specific, when the first terminal is in the dual-registration mode, the first terminal may connect to both the first network device and the second network device. When failing to call the second terminal through VoNR, the first terminal migrates call-related data to an LTE network, and calls the second terminal again through VoLTE.

In FIG. 6B, a networking manner of the first network device is SA networking. The communication system 30 may be a simplified communication system 10. A first terminal, a second terminal, a first network device, and a second network device in the communication system 10 may be respectively the terminal 100, the terminal 400, a device in the 5G SA network (including a 5G base station and a device in a 5GC), and a device in the LTE network (including a 4G base station and a device in an EPC) mentioned in the foregoing embodiments.

It may be understood that for a specific implementation of the call method of the terminal in the dual-registration mode described in FIG. 6B, refer to the foregoing related descriptions in FIG. 5A-1 and FIG. 5A-2 and FIG. 5B.

In some embodiments, the communication system 20 or the communication system 30 may further include a third network device. If the first terminal fails to call the second terminal through VoLTE, the first terminal may alternatively stop connecting to the second network device through the LTE link, connect to the third network device through a 2G/3G link, and then call the second terminal again through a CS domain. Herein, the third network device may be a device in a 2G/3G network, for example, may include a 2G/3G base station and a device in a 2G/3G core network.

To better implement the 5G SA network-based call method provided in embodiments of this application, embodiments of this application further provide a corresponding apparatus.

Figure 7A:
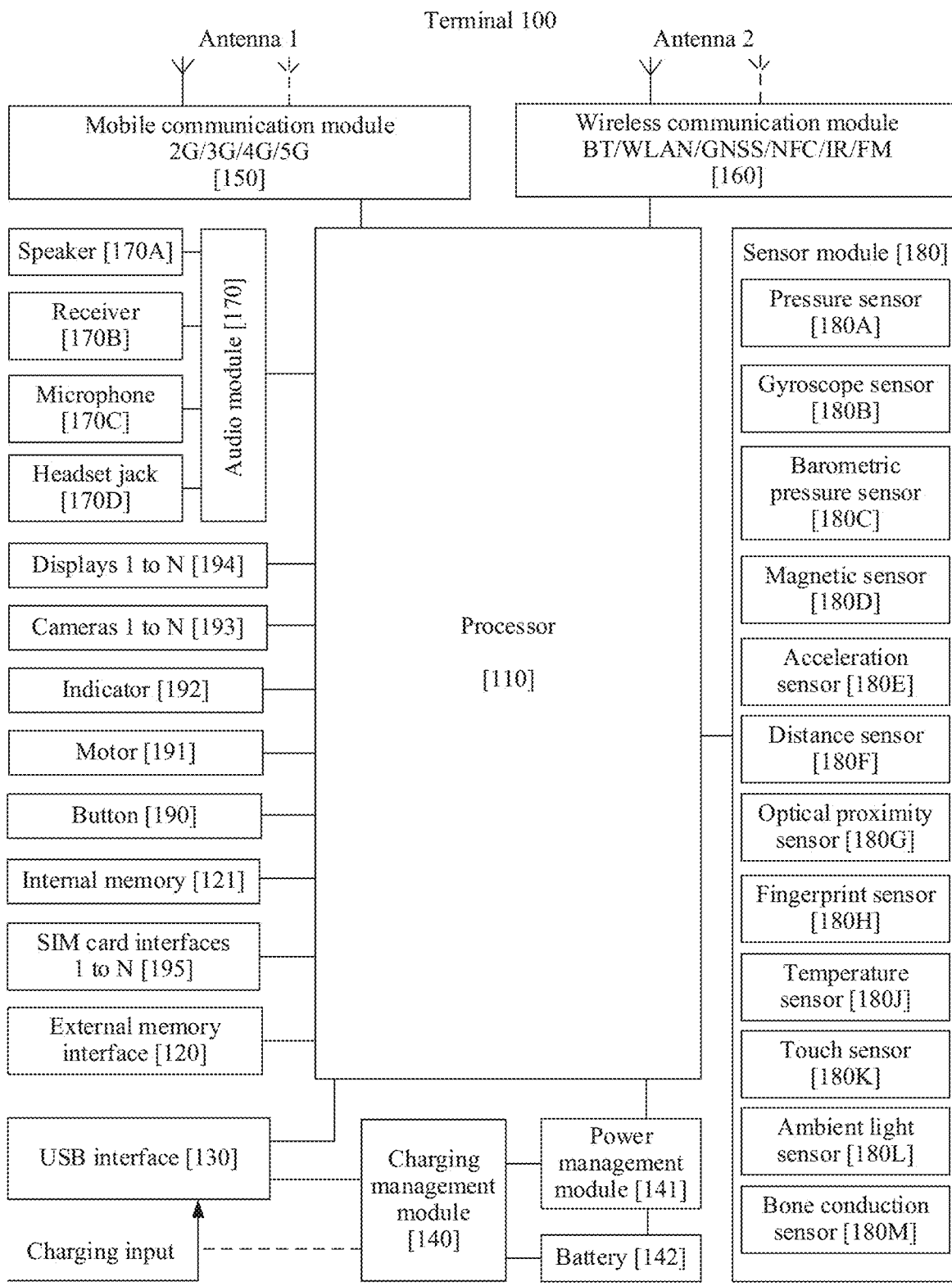
FIG. 7A is a schematic diagram of a hardware structure of a terminal according to an embodiment of this application.

FIG. 7A is a schematic diagram of a structure of a terminal 100 according to an embodiment of this application. The terminal 100 may be the terminal 100 mentioned in the foregoing embodiment.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal 100. The terminal 100 may include more or fewer components than those shown in the figure, or some components may be combined, or some components may be split, or there may be a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors. A memory may be further disposed in the processor 110, and is configured to store instructions and data.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the terminal 100, for wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module. In some embodiments, the terminal 100 may include two modem processors, one corresponding to 4G, and the other corresponding to 5G.

The wireless communication module 160 may provide a wireless communication solution that includes wireless local area networks (wireless local area networks, WLAN) (for example, a wireless fidelity (wireless fidelity, Wi-Fi) network), Bluetooth (Bluetooth, BT), and the like and that is applied to the terminal 100. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology. The wireless communication technology may include a GSM, a GPRS, CDMA, WCDMA, TD-SCDMA, LTE, NR, BT, a WLAN, NFC, FM, an IR technology, and/or the like.

In this embodiment of this application, the wireless communication module 160 is configured to: under an instruction of the processor, connect to different networks and call a terminal 400. In some embodiments, after connecting to a 5G SA network, the wireless communication module 160 may call the terminal 400 through VoNR. After failing to call the terminal 400 through VoNR, the wireless communication module 160 falls back from the 5G SA network to an LTE network, and calls the terminal 400 through VoLTE. In some other embodiments, the wireless communication module 160 may connect to both the 5G SA network and the LTE network. After failing to call the terminal 400 through VoNR, the wireless communication module 160 calls the terminal 400 through VoLTE. Herein, for a specific operation implemented by the wireless communication module 160, refer to related descriptions in the foregoing embodiments in FIG. 4A-1 and FIG. 4A-2 and FIG. 5A-1 and FIG. 5A-2. Details are not described herein again.

The terminal 100 implements the display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel.

The terminal 100 can implement a photographing function by using the ISP, the camera 193, the video codec, the GPU, the display 194, the application processor, and the like. The ISP may be configured to process data fed back by the camera 193. The camera 193 may be configured to capture a static image or a video. The digital signal processor is configured to process a digital signal, and may process another digital signal in addition to the digital image signal. For example, when the terminal 100 selects a frequency, the digital signal processor is configured to perform Fourier transform and the like on frequency energy. The video codec is configured to compress or decompress a digital video.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like.

The terminal 100 may implement audio functions such as music playing and recording through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display 194.

The touch sensor 180K is also referred to as a touch panel. The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the terminal 100 in a position different from a position of the display 194.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The terminal 100 interacts with a network through a SIM card, to implement functions such as calling and data communication. In some embodiments, the terminal 100 uses an eSIM, namely, an embedded SIM card. The eSIM card may be embedded in the terminal 100, and cannot be separated from the terminal 100.

In this embodiment of this application, the SIM card is configured to store user information, for example, an IMSI.

A software system of the terminal 100 may use a layered architecture, an event-driven architecture, a microkernel architecture, a microservice architecture, or a cloud architecture. In embodiments of this application, an Android system with a hierarchical architecture is used as an example to describe a software structure of the terminal 100.

Figure 7B:
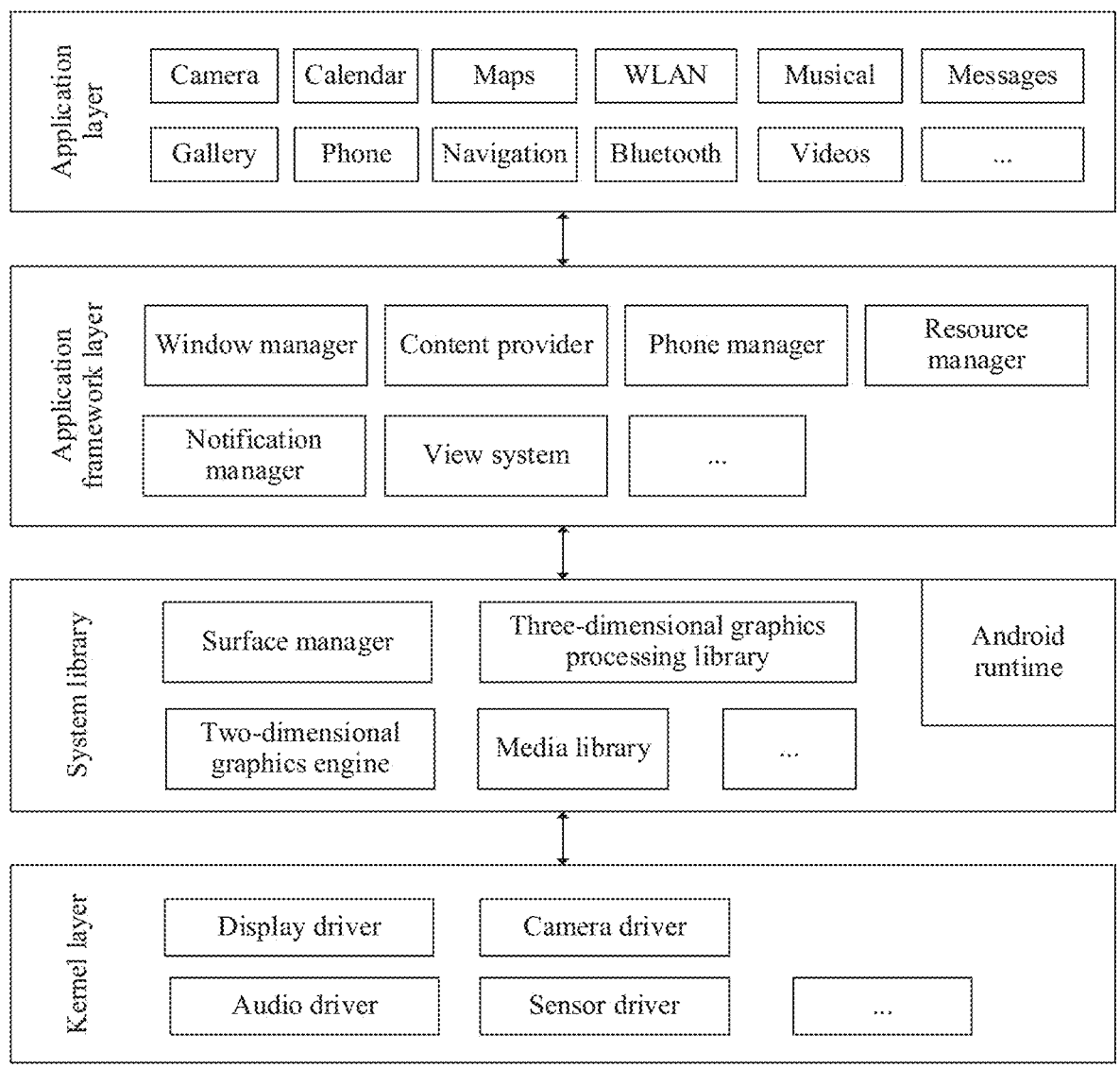
FIG. 7B is a schematic diagram of a software architecture of a terminal according to an embodiment of this application.

FIG. 7B is a block diagram of a software structure of a terminal 100 according to an embodiment of this application.

In a layered architecture, software is divided into several layers, and each layer has a clear role and task. The layers communicate with each other through a software interface. In some embodiments, a system is divided into four layers: an application layer, an application framework layer, a system runtime (runtime) and system library, and a kernel layer from top to bottom.

The application layer may include a series of application packages.

As shown in FIG. 7B, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 7B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including a notification icon of Messages may include a text display view and an image display view.

The phone manager is configured to provide a communication function of the terminal 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction.

The runtime includes a kernel library and a virtual machine. The runtime is responsible for scheduling and management of an Android system.

The kernel library includes two parts: a function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), media libraries (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 8:
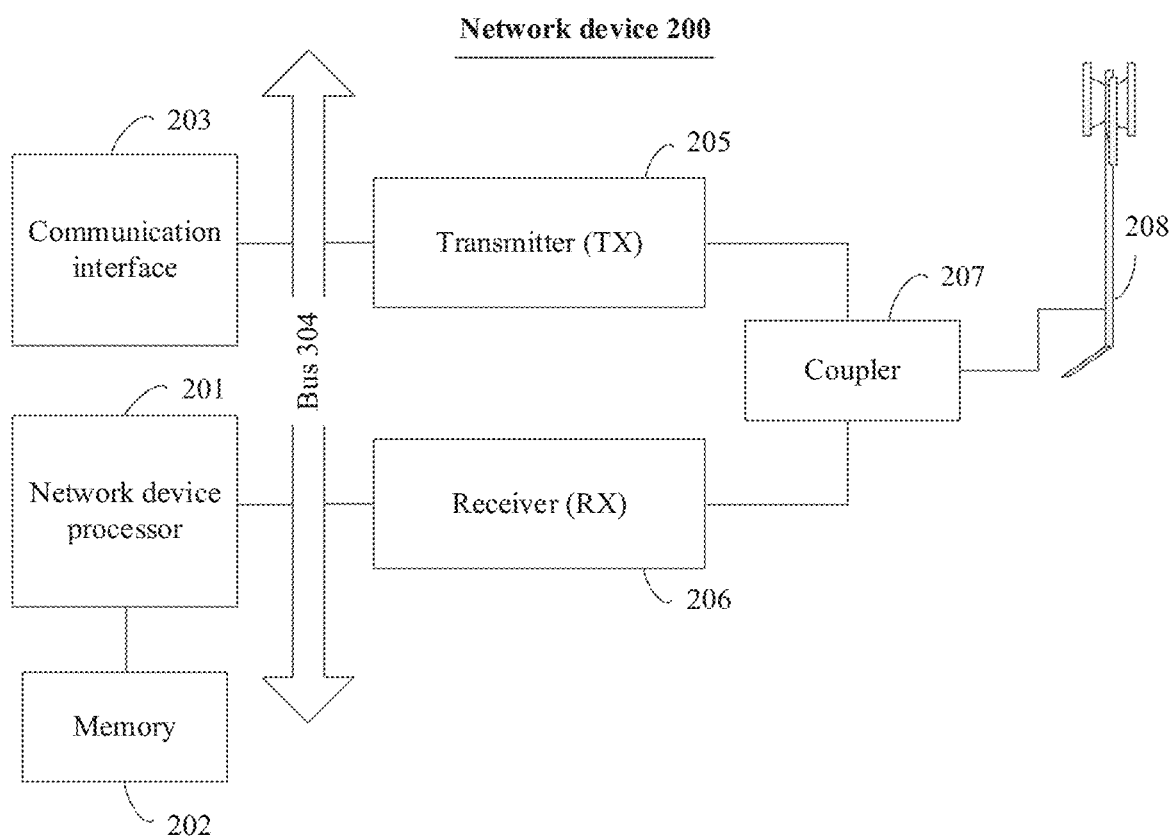
FIG. 8 is a schematic diagram of a structure of a network device according to an embodiment of this application.

FIG. 8 is a schematic diagram of a structure of a network device 200 according to an embodiment of this application. The network device 200 may be the 5G base station 201 in the foregoing embodiment, or may be implemented as a gNodeB.

As shown in FIG. 8, the network device 200 may include one or more processors 201, a memory 202, a communication interface 203, a transmitter 205, a receiver 206, a coupler 207, and an antenna 208. The components may be connected through a bus 204 or in another manner. In FIG. 8, an example in which the components are connected through a bus is used.

The communication interface 203 may be used by the network device 200 to communicate with another communication device, for example, a terminal 100, a 5GC 202, or another network device. Specifically, the communication interface 303 may be a 5G or future new radio communication interface. Not limited to being provided with a wireless communication interface, the network device 200 may be further provided with the wired communication interface 203 to support wired communication, for example, a backhaul link between the network device 200 and another network device 200 may be a wired communication connection.

In some embodiments of this application, the transmitter 205 and the receiver 206 may be considered as a wireless modem. The transmitter 205 may be configured to perform transmission processing on a signal output by the processor 201. The receiver 206 is configured to receive a signal. The network device 200 may include one or more transmitters 205 and one or more receivers 206. The antenna 208 may be configured to convert electromagnetic energy in a transmission line into an electromagnetic wave in free space, or convert an electromagnetic wave in the free space into electromagnetic energy in the transmission line. The coupler 207 may be configured to split the mobile communication signal into a plurality of signals, and distribute the plurality of signals to a plurality of receivers 206. It may be understood that the antenna 208 of the network device may be implemented as a large-scale antenna array.

The memory 202 is coupled to the processor 201, and is configured to store various software programs and/or a plurality of groups of instructions. Specifically, the memory 302 may include a high-speed random access memory, or a non-volatile memory, for example, one or more disk storage devices, a flash memory device, or another non-volatile solid-state storage device.

The memory 202 may store an operating system (briefly referred to as a system below), for example, an embedded operating system such as uCOS, VxWorks, or RTLinux. The memory 202 may further store a network communication program, and the network communication program may be configured to communicate with one or more adjuncts, one or more terminal devices, and one or more network devices.

In this embodiment of this application, the processor 201 may be configured to read and execute computer-readable instructions. Specifically, the processor 201 may be configured to invoke the program stored in the memory 202, for example, the program for implementing, on the network device 200, the 5G SA network-based call method provided in one or more embodiments of this application, and execute an instruction included in the program.

It should be noted that the network device 200 shown in FIG. 8 is merely an implementation of embodiments of this application, and in actual application, the network device 200 may further include more or fewer components. This is not limited herein.

Figure 9:
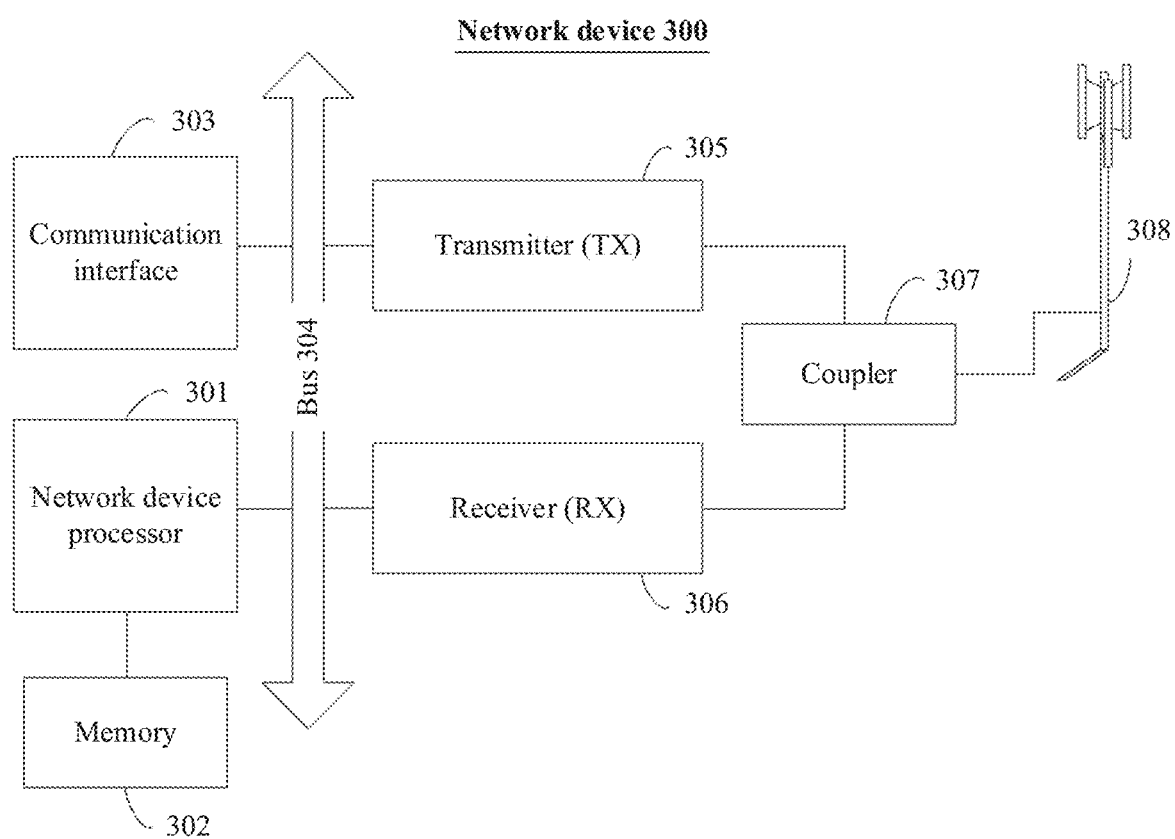
FIG. 9 is a schematic diagram of a structure of another network device according to an embodiment of this application.

FIG. 9 is a schematic diagram of a structure of a network device 300 according to an embodiment of this application. The network device 300 may be the 4G base station 601 in the foregoing embodiment, or may be implemented as an eNodeB.

As shown in FIG. 9, the network device 300 may include one or more processors 301, a memory 302, a communication interface 303, a transmitter 305, a receiver 306, a coupler 307, and an antenna 308. The components may be connected through a bus 304 or in another manner. In FIG. 9, an example in which the components are connected through a bus is used.

The communication interface 303 may be used by the network device 300 to communicate with another communication device, for example, a terminal device or another network device. Specifically, the communication interface 203 may be a long term evolution (LTE) (4G) communication interface. Not limited to being provided with a wireless communication interface, the network device 300 may be further provided with the wired communication interface 303 to support wired communication, for example, a backhaul link between the network device 300 and another network device 200 may be a wired communication connection.

In some embodiments of this application, the transmitter 305 and the receiver 306 may be considered as a wireless modem. The transmitter 305 may be configured to perform transmission processing on a signal output by the processor 301. The receiver 306 is configured to receive a signal. The network device 300 may include one or more transmitters 305 and one or more receivers 306. The antenna 308 may be configured to convert electromagnetic energy in a transmission line into electromagnetic waves in free space, or convert electromagnetic waves in free space into electromagnetic energy in a transmission line. The coupler 307 may be configured to split a received mobile communication signal into a plurality of subsignals and allocate the plurality of subsignals to a plurality of receivers 306. It may be understood that the antenna 308 of the network device may be implemented as a large-scale antenna array.

The memory 302 is coupled to the processor 301, and is configured to store various software programs and/or a plurality of groups of instructions. Specifically, the memory 302 may include a high-speed random access memory, and may also include a non-volatile memory, for example, one or more disk storage devices, a flash memory device, or another non-volatile solid-state storage device.

The memory 302 may store an operating system (briefly referred to as a system below), for example, an embedded operating system such as uCOS, VxWorks, or RTLinux. The memory 302 may further store a network communication program, and the network communication program may be configured to communicate with one or more adjuncts, one or more terminal devices, and one or more network devices.

In this embodiment of this application, the processor 301 may be configured to read and execute computer-readable instructions. Specifically, the processor 301 may be configured to invoke the program stored in the memory 302, for example, the program for implementing, on the network device 300, the 5G SA network-based call method provided in one or more embodiments of this application, and execute instructions included in the program.

It should be noted that the network device 300 shown in FIG. 9 is merely an implementation of embodiments of this application, and in actual application, the network device 300 may further include more or fewer components. This is not limited herein.

The implementations of this application may be randomly combined to achieve different technical effects.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

In conclusion, what are described above are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A first terminal comprising:
a memory configured to store instructions; and
one or more processors coupled to the memory and configured to execute the instructions to:
connect to a first network device in a standalone (SA) network through a New Radio (NR) link;
receive a user operation;
initiate, in response to the user operation, a first call to a second terminal by using a Voice over New Radio (VoNR) technology;
when the first call fails:
stop connecting to the first network device through the NR link;
connecting to a second network device through a Long-Term Evolution (LTE) link;
initiating a second call to the second terminal by using a Voice over LTE (VOLTE) technology; and
preventing re-connecting to the first network device when initiating the second call; and
skip, after connecting to the second network device and when a reporting condition of an NR-related B1 event or an NR-related B2 event is met, reporting the NR-related B1 event or the NR-related B2 event to the second network device.

2. The first terminal of claim 1, wherein the one or more processors are further configured to execute the instructions to send a detach request to the first network device to instruct the first network device to release a context of the first terminal.

3. The first terminal of claim 1, wherein the one or more processors are further configured to execute the instructions to further connect to the second network device autonomously.

4. The first terminal of claim 1, wherein the one or more processors are further configured to execute the instructions to:
report an LTE-related B1 event or an LTE-related B2 event to the first network device; and
receive, from the first network device, an instruction to connect, in a handover manner or a redirection manner, to the second network device through the LTE link.

5. The first terminal of claim 1, wherein the one or more processors are further configured to execute the instructions to send a network capability message to the second network device when connecting to the second network device, and wherein the network capability message indicates that the first terminal does not support 5th generation (5G) networking.

6. The first terminal of claim 1, wherein the one or more processors are further configured to execute the instructions to identify that the first call fails when receiving error indication information or when not receiving a response message from the second terminal within a first duration after initiating the first call.

7. The first terminal of claim 1, wherein the one or more processors are further configured to execute the instructions to remain on the second call with the second terminal after successfully calling the second terminal.

8. The first terminal of claim 7, wherein the one or more processors are further configured to execute the instructions to:
stop the second call;
stop, after stopping the second call, connecting to the second network device; and
re-connect to the first network device through the NR link.

9. The first terminal of claim 1, wherein when the second call fails, the one or more processors are further configured to execute the instructions to
stop connecting to the second network device through the LTE link;
connect to a third network device through a 2nd generation (2G)/3rd generation (3G) link; and
initiate a third call to the second terminal through a circuit switched (CS) domain.

10. A 5th generation (5G) standalone (SA) network-based call method implemented by a first terminal, wherein the 5G SA network-based call method comprises:
connecting to a first network device in an SA network through a New Radio (NR) link;
receiving a user operation;
initiating, in response to the user operation, a first call to a second terminal by using a Voice over New Radio (VoNR) technology;
when the first call fails:
stop connecting to the first network device through the NR link;
connecting to a second network device through a Long-Term Evolution (LTE) link;
initiating a second call to the second terminal by using a Voice over LTE (VOLTE) technology; and
preventing re-connecting to the first network device when initiating the second call; and
skipping, after connecting to the second network device and when a reporting condition of an NR-related B1 event or an NR-related B2 event is met, reporting the NR-related B1 event or the NR-related B2 event to the second network device.

11. The 5G SA network-based call method of claim 10, further comprising sending a detach request to the first network device to instruct the first network device to release a context of the first terminal.

12. The 5G SA network-based call method of claim 10, wherein connecting to the second network device further comprises connecting to the second network device autonomously.

13. The 5G SA network-based call method of claim 10, further comprising:
reporting an LTE-related B1 event or an LTE-related B2 event to the first network device; and
receiving, from the first network device, an instruction to connect to the second network device through the LTE link in a handover manner or a redirection manner.

14. The 5G SA network-based call method of claim 10, further comprising sending a network capability message to the second network device when connecting to the second network device, and wherein the network capability message indicates that the first terminal does not support 5th generation (5G) networking.

15. The 5G SA network-based call method of claim 10, further comprising identifying that the first call fails when receiving error indication information or when not receiving a response message from the second terminal within a first duration after initiating the first call.

16. The 5G SA network-based call method of claim 10, further comprising remaining on the second call with the second terminal after successfully calling the second terminal.

17. The 5G SA network-based call method of claim 16, further comprising:
stopping the second call;
stop, after stopping the second call, connecting to the second network device; and
re-connecting to the first network device through the NR link.

18. The 5G SA network-based call method of claim 10, wherein when the second call fails, the 5G SA network-based call method further comprises:
stop connecting to the second network device through the LTE link;
connecting to a third network device through a 2nd generation (2G)/3rd generation (3G) link; and
initiating a third call to the second terminal through a circuit switched (CS) domain.

19. A computer program product comprising instructions that are stored on a non-transitory computer-readable storage medium and that, when executed by one or more processors, cause a first terminal to:
connect to a first network device in a standalone (SA) network through a New Radio (NR) link;
receive a user operation;
initiate, in response to the user operation, a first call to a second terminal by using a Voice over New Radio (VoNR) technology;
when the first call fails:
stop connecting to the first network device through the NR link;
connecting to a second network device through a Long-Term Evolution (LTE) link;
initiating a second call to the second terminal by using a Voice over LTE (VOLTE) technology; and
preventing re-connecting to the first network device when initiating the second call; and
skip, after connecting to the second network device and when a reporting condition of an NR-related B1 event or an NR-related B2 event is met, reporting the NR-related B1 event or the NR-related B2 event to the second network device.

20. The computer program product of claim 19, wherein the one or more processors are further configured to execute the instructions to send a detach request to the first network device to instruct the first network device to release a context of the first terminal.

* * * * *